United States Patent
Corbalis et al.

(10) Patent No.: US 7,618,345 B2
(45) Date of Patent: Nov. 17, 2009

(54) EXERCISE EQUIPMENT WITH UNIVERSAL PDA CRADLE

(75) Inventors: Kevin P. Corbalis, Tustin, CA (US);
Javier J. Reyes, Fullerton, CA (US);
Felipe J. Marin, Santa Ana, CA (US);
Victor Torres Cornejo, Tustin, CA (US); Gregory Allen Wallace, Mission Viejo, CA (US); Charles Joseph Heiden, Anaheim Hills, CA (US)

(73) Assignee: Unisen, Inc., Irvine, CA (US)

( * ) Notice: Subject to any disclaimer, the term of this patent is extended or adjusted under 35 U.S.C. 154(b) by 738 days.

(21) Appl. No.: 10/698,236

(22) Filed: Oct. 31, 2003

(65) Prior Publication Data

US 2004/0092367 A1    May 13, 2004

Related U.S. Application Data

(63) Continuation-in-part of application No. 10/299,648, filed on Nov. 19, 2002, now Pat. No. 7,086,995, and a continuation-in-part of application No. 10/299,627, filed on Nov. 19, 2002, now Pat. No. 6,878,099, and a continuation-in-part of application No. 10/299,625, filed on Nov. 19, 2002, now Pat. No. 7,179,202.

(60) Provisional application No. 60/399,336, filed on Jul. 26, 2002.

(51) Int. Cl.
*A63B 22/02* (2006.01)

(52) U.S. Cl. ............... 482/8; 482/1; 482/51; 482/54

(58) Field of Classification Search ............ 482/1–9, 482/900–902, 51, 54
See application file for complete search history.

(56) References Cited

U.S. PATENT DOCUMENTS

| 4,039,467 | A | 8/1977 | Tucker et al. |
| 6,496,874 | B1 * | 12/2002 | Janky et al. ............. 710/1 |
| 6,509,715 | B1 * | 1/2003 | LaRue .................. 320/107 |
| 6,702,719 | B1 * | 3/2004 | Brown et al. ............. 482/8 |
| 6,745,943 | B2 * | 6/2004 | Schlieffers et al. ... 235/472.01 |
| 7,054,148 | B2 * | 5/2006 | Chen et al. ............. 361/683 |
| 7,128,692 | B2 * | 10/2006 | Black ................... 482/8 |
| 7,171,378 | B2 * | 1/2007 | Petrovich et al. ......... 705/26 |
| 7,189,191 | B2 * | 3/2007 | Dugan ................... 482/8 |
| 2002/0091796 | A1 * | 7/2002 | Higginson et al. ....... 709/218 |
| 2003/0225939 | A1 | 12/2003 | Ying et al. |
| 2004/0070924 | A1 | 4/2004 | Wu |
| 2004/0090350 | A1 | 5/2004 | Yang |

FOREIGN PATENT DOCUMENTS

| DE | 20 2004 007 725 U1 | 8/2004 |
| WO | WO 00 69525 A | 11/2000 |

OTHER PUBLICATIONS

Star Trac, Press Release: "A Favorable Breeze", The Orange County Register, Business Monday, Jun. 17, 2002, 4 pages.
European Search Report, dated Sep. 21, 2005; 3 pages.

* cited by examiner

*Primary Examiner*—Glenn Richman
(74) *Attorney, Agent, or Firm*—Knobbe, Martens, Olson & Bear, LLP

(57) ABSTRACT

An exercise machine has a universal holder that is adapted to facilitate communication between the machine and a variety of portable electronic device configurations. The universal holder can be formed of a material that is generally transparent to infrared signals, but that is generally optically opaque.

8 Claims, 29 Drawing Sheets

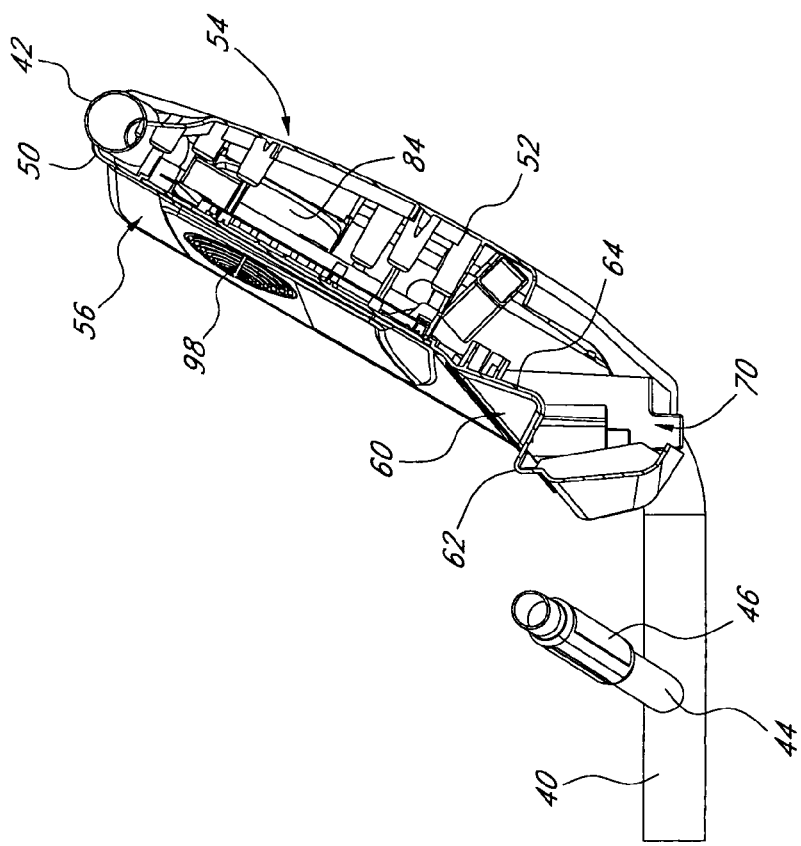
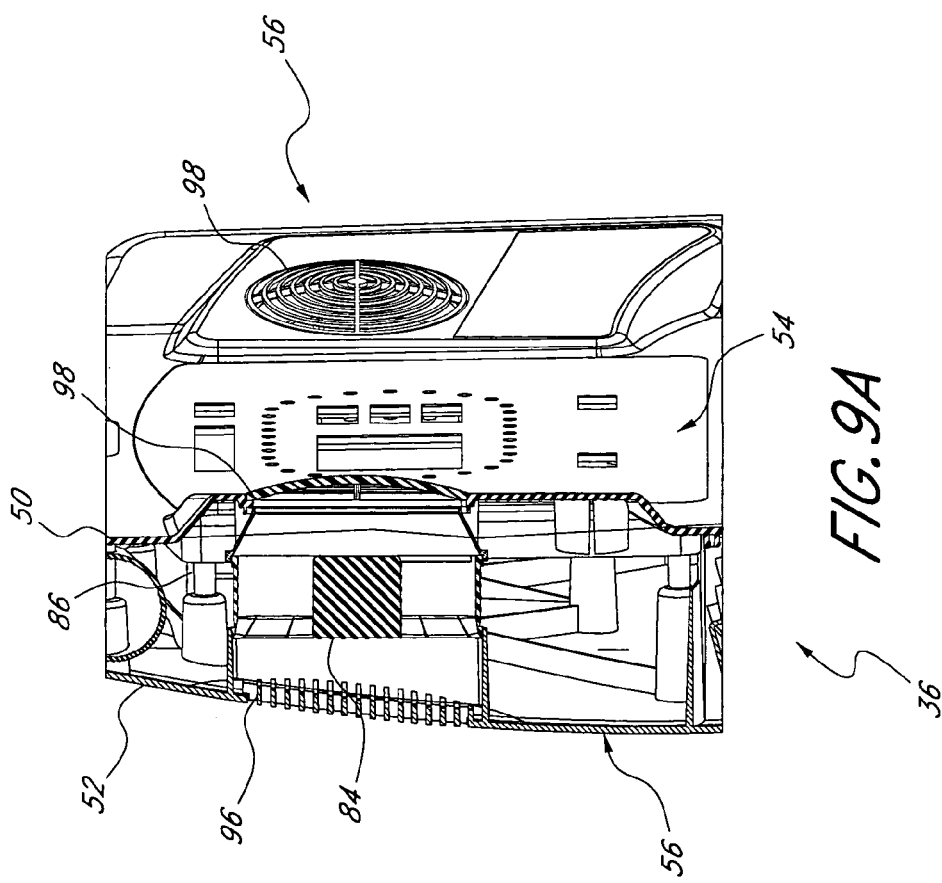

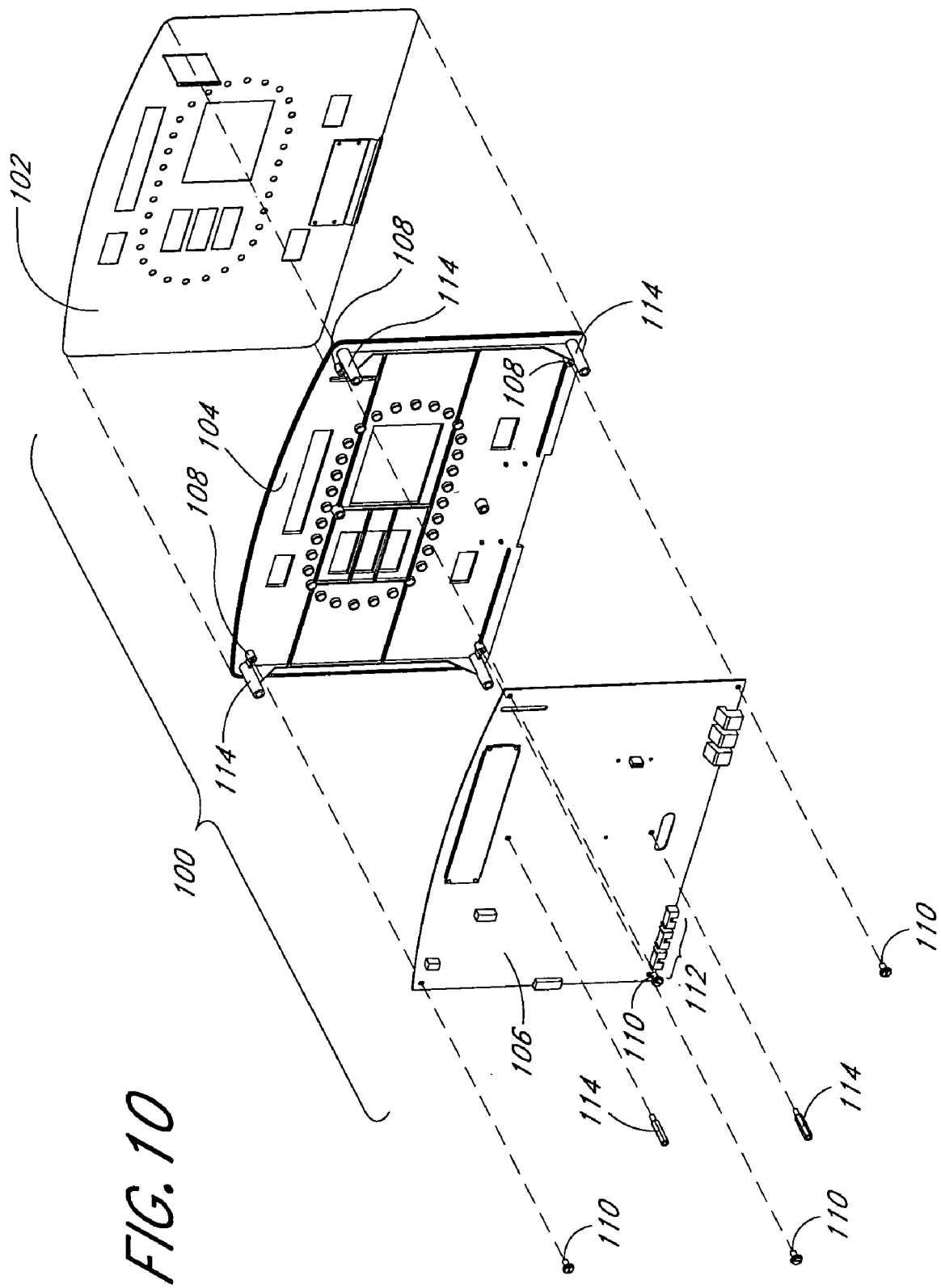

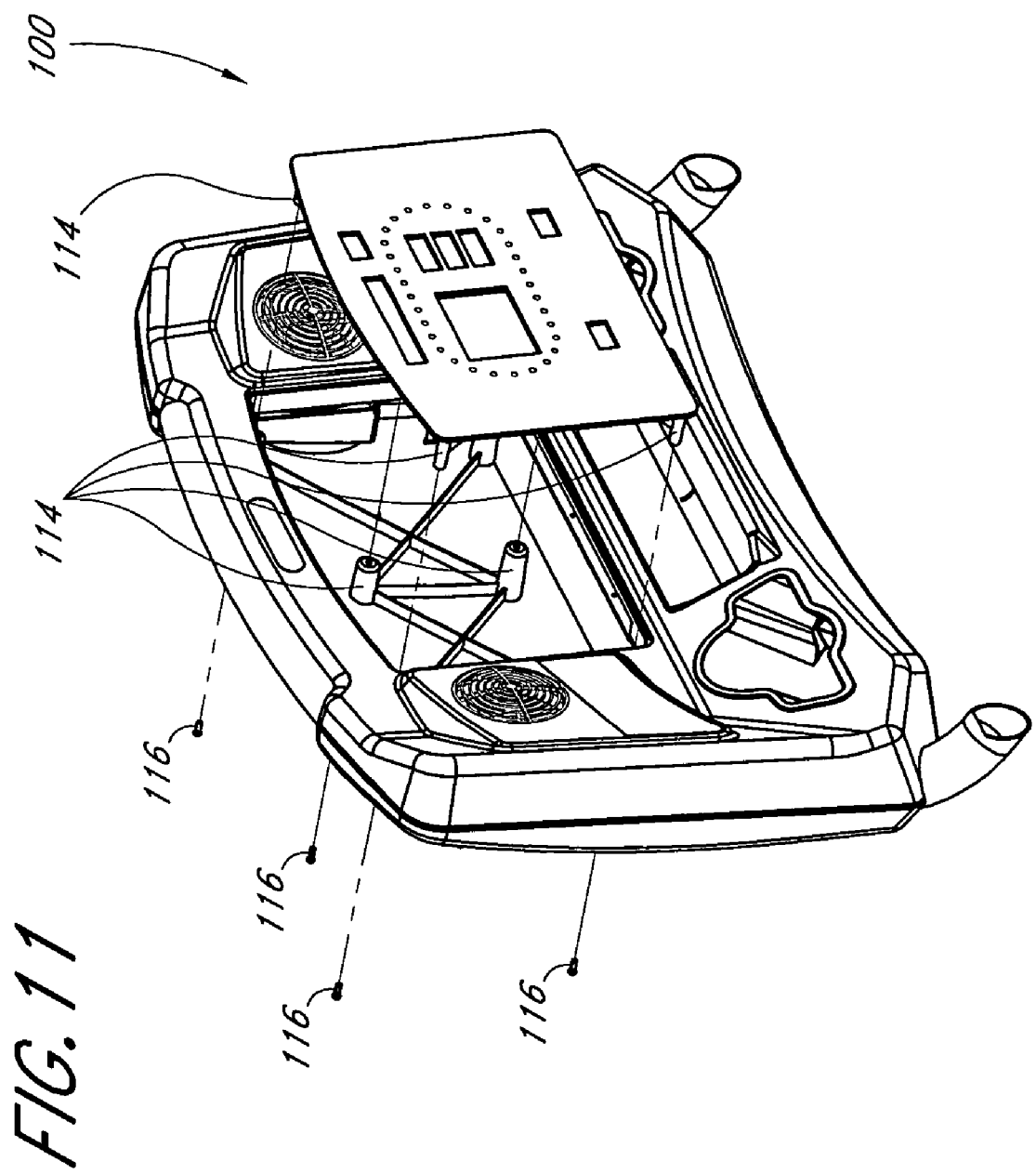

| FIG.16 | FIG.16A | FIG.16B |

EXERCISE EQUIPMENT WITH UNIVERSAL PDA CRADLE

REFERENCE TO RELATED APPLICATION

The present application is a continuation-in-part of U.S. application Ser. No. 10/299,648 filed Nov. 19, 2002 now U.S. Pat. No. 7,086,995, a continuation-in-part of U.S. application Ser. No. 10/299,627, filed Nov. 19, 2002 now U.S. Pat. No. 6,878,099, and a continuation-in-part of U.S. application Ser. No. 10/299,625, filed Nov. 19, 2002 now U.S. Pat. No. 7,179,202, each of which claimed the priority benefit under 35 U.S.C. § 119(e) of U.S. Provisional Application No. 60/399,336, filed Jul. 26, 2002. The disclosures of each of these applications is hereby expressly incorporated by reference in its entirety.

BACKGROUND OF THE INVENTION

1. Field of the Invention

The present invention relates to exercise equipment arranged and configured for communications with portable electronic devices. More specifically, the present invention relates to exercise equipment featuring a universal holder that facilitates infrared communication with diverse portable electronic devices, such as cellular telephones, handheld computers, notebook computers, or any of a number of personal digital assistant (PDA) styles, for instance, such that each device can communicate with the exercise equipment when the device is placed within the holder.

2. Description of Related Art

Exercise equipment is used in public gym facilities by many people. Some forms of exercise admit to extended periods of cardiovascular exercise. For instance, people often use treadmills, elliptical trainers, stationary bicycles and stair machines for extended periods of time. The designs of these devices have evolved over the years and most of these devices now feature display panels or other components that include holders for items commonly carried by exercising people. For instance, many devices offer a holders designed for water bottles, keys, towels and the like.

Recently, the exercising public has been introduced to programs that can be used with a portable electronic device, such as a PDA, to track fitness activities. In most of these programs, data is entered into the PDA manually as each exercise is completed. The manual entry of data interrupts the workout and can be rather inconvenient for the user, both of which decrease the desirability of such programs.

SUMMARY OF THE INVENTION

Even more recently, however, some programs have been designed to directly communicate with the portable electronic device and automatically enter data into the device. In addition, exercise equipment manufacturers have begun placing downloadable workout routines on their websites. Such routines can be transmitted from a PDA to the exercise equipment such that the time, the intensity and other variable components of the exercise routine can be quickly and easily programmed into the exercise equipment. To transmit data to the exercise equipment or to receive data from the exercise equipment, a user would have to hold the PDA or other electronic device in an appropriate position such that an infrared port of the PDA was aligned with an infrared port of the device. As is known, each PDA manufacturer (e.g., PALM, IPAQ, HP, etc.) may have the infrared port in a different location on the PDA and other portable electronic devices also may have varied sizes and placements of the infrared port. Furthermore, the location of the port must be identified on the exercise equipment for a user to understand where to place the port of the PDA.

Such an arrangement, while having advantages over manual entry, has several disadvantages in the eye of both the manufacturer and the user. For instance, placing an infrared port in an exposed location can result in damage to the infrared port over time. In addition, in a world in which cleanliness and appearance of exercise machines is important, the port can pose difficulties in cleaning as well as place an obtrusive element within a pleasing aesthetic design. Moreover, in order for a proper transfer of data, the two ports must be properly aligned during the entire transfer. Thus, the user would be expected to maintain the proper alignment during the entire transfer, which limits the length of time during which the PDA and the exercise equipment can communicate.

Accordingly, one aspect of the present invention features a universal holder that holds personal items including a variety of portable electronic devices and allows the exercise equipment to directly communicate with each such device through an infrared signal when placed within the holder. The universal holder desirably is formed of a material that is generally transparent to infrared signals, but that is generally optically opaque.

In one arrangement, a portable electronic device can be used to directly provide the exercise equipment with a pre-programmed specific exercise routine. In another arrangement, the exercise equipment can provide the user with specific exercise routine results and progress corresponding to a user designed work-out routine through communication with the portable electronic device. In a further arrangement, the owner of the exercise equipment can use communications with a portable electronic device to work with a manufacturer to troubleshoot faltering equipment or the owner can install manufacturer provided software upgrades.

Another aspect of the present invention provides a portable electronic device holder that is designed to hold various different portable electronic devices, including diverse PDA models, in any of a number of positions such that the infrared port of the portable electronic device is properly aligned relative to the exercise equipment infrared port. Such an arrangement allows for sustained and accurate infrared communication. For example, PDA models that have their infrared communication port placed on a top surface of the PDA can be placed in an upright position allowing for accurate communication with the holder. Other PDA models that position their infrared communication port on a side surface can be placed on a side to allow for accurate communication by disposing the port along an upper surface.

A further aspect of the present invention involves an infrared communication system for an exercise machine. The infrared communication system comprises a holder arranged to support a portable electronic device in at least two orientations and a transceiver mounted to communicate by infrared signal to the portable electronic device positioned within the holder. The holder is formed of a material that is generally transparent to infrared signals and that is optically opaque.

Another aspect of the present invention involves an exercise device comprising a display console that comprises a holder. An infrared port is disposed proximate the holder and has a cone of emission that intersects the holder. The holder comprises a first recess and a second recess with the first recess being vertically above the second recess and at least a portion of the first recess overlapping at least a portion of the second recess.

One other aspect of the present invention involves an exercise device comprising a display console that comprises a holder and a device infrared transceiver disposed proximate the holder. The holder comprises means for aligning an infrared transceiver of each of a plurality of portable electronic device configurations with the exercise device infrared transceiver while supporting the portable electronic device.

A feature of the present invention also involves an exercise device comprising a frame assembly, a device infrared transceiver being supported by the frame assembly and means for aligning a portable electronic device infrared transceiver of each of a plurality of portable electronic device configurations with the device infrared transceiver while supporting the portable electronic device relative to the frame.

For purposes of summarizing the invention, certain aspects, advantages and novel features of the invention have been described herein. Of course, it is to be understood that not necessarily all such aspects, advantages or features will be embodied in any particular embodiment of the invention.

BRIEF DESCRIPTION OF THE DRAWINGS

These and other features, aspects and advantages of the present invention will now be described with reference to the drawings. The drawings and the associated descriptions are provided to illustrate embodiments of the present invention and not to limit the scope of the invention. Throughout the drawings, reference numbers will be consistently used to indicate corresponding elements in different figures.

FIG. 9A is a section view generally taken along the line A-A in FIG. 7.

FIG. 9B is a section view generally taken along the line B-B in FIG. 7.

FIG. 10 is an exploded view showing a display electronics assembly used with the display console of FIG. 7, which assembly is arranged and configured in accordance with certain features, aspects and advantages of the present invention.

FIG. 11 is an exploded view showing a mounting arrangement used to secure the display electronics assembly of FIG. 10 to the display console of FIG. 7, which arrangement comprises certain features, aspects and advantages of the present invention.

DETAILED DESCRIPTION OF THE PREFERRED EMBODIMENTS

Figure 1:
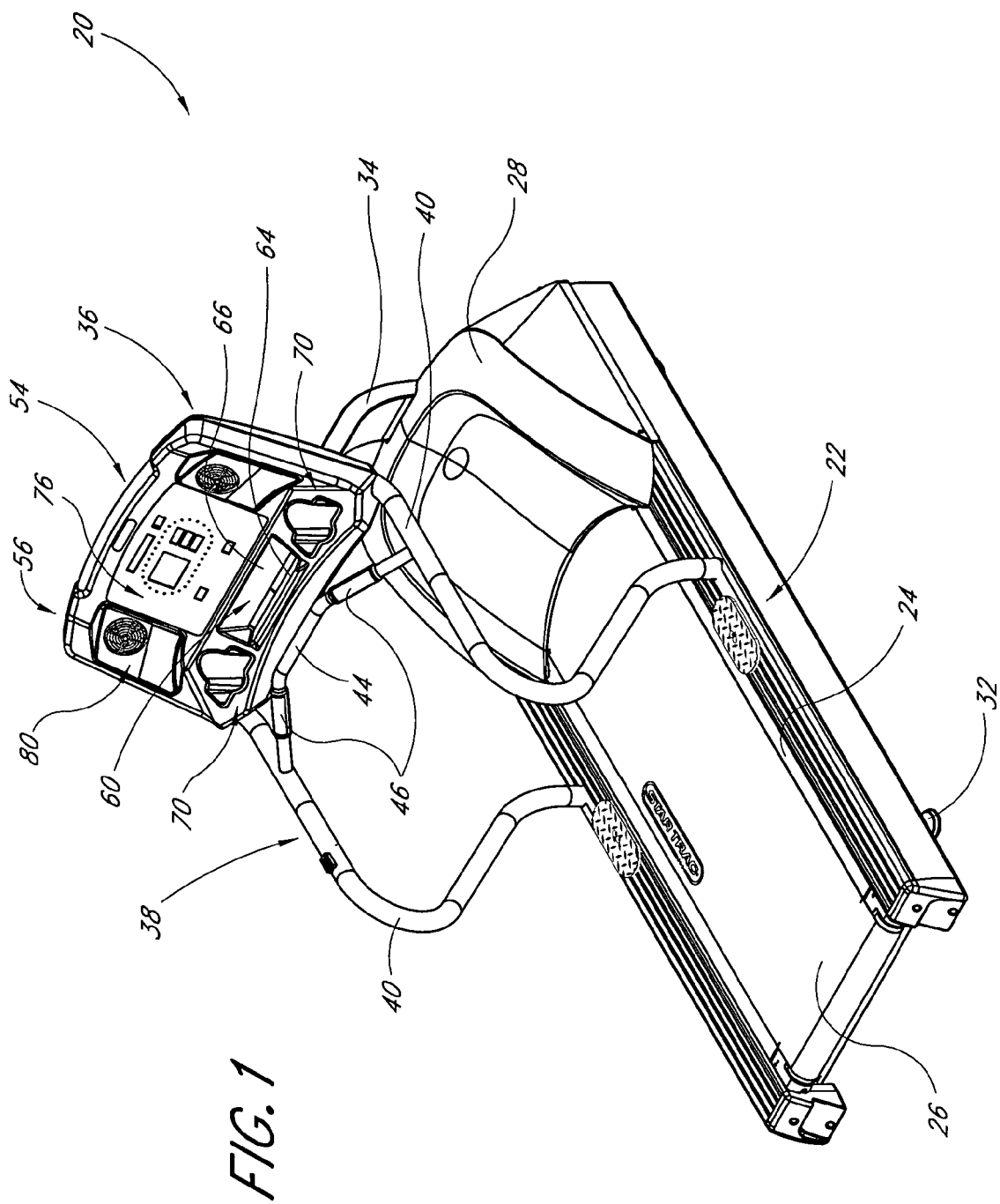
FIG. 1 is a perspective view of a treadmill taken from the upper, rear, right side, which is arranged and configured in accordance with certain features, aspects and advantages of the present invention.

With reference now to FIGS. 1-6, a treadmill 20 that is arranged and configured in accordance with certain features, aspects and advantages of the present invention is illustrated therein. While various features of the present invention have been shown and will be described in the context of the treadmill 20, the present invention also can be used with other forms of exercise apparatus, such as, but not limited to, stair climbers, elliptical exercise machines, stationary bicycles, ski machines and the like.

The treadmill 20 generally comprises a frame assembly 22. The frame assembly 22 can have any suitable configuration. In one arrangement, the frame assembly 22 is formed by a number of tubular members that are secured together by, for instance, welding, brackets and/or fasteners. The frame assembly 22 generally defines a base structure of the treadmill 20.

A support surface 24 is connected to the frame assembly 22. The support surface 24 can be secured to the frame assembly 22 in any suitable manner. The support surface generally defines a planar surface upon which a user is supported when mounting the treadmill 20, when dismounting the treadmill 20 and when exercising on the treadmill 20.

An endless belt 26 extends over the support surface 24. The endless belt 26 is tensioned and driven by a belt drive assembly (not shown). Any suitable belt drive assembly can be used. The belt drive assembly preferably is a motor driven assembly, which comprises a motor 29 (shown schematically in FIG. 3 connected to a shaft 27 driving the belt 26). In some applications, however, the belt drive assembly is not actually driving the belt, but may be turning a generator based upon movement of the belt, which is imparted by the user. In the illustrated arrangement, a motor housing 28 is disposed over a forward portion of the endless belt 26. The motor housing 28 advantageously comprises a contoured surface that faces the user such that the user is less likely to kick the motor housing 28 during use.

The frame assembly 22 can be supported in any suitable manner relative to a floor or other surface. In the illustrated arrangement, the frame assembly 22 is supported by a pair of rollers 30 at a forward end and by a pair of leveling feet 32 at a rearward end. The illustrated arrangement advantageously results in the rollers 30 being placed beneath a majority of the machine weight. In other arrangements, any number of leveling feet or rollers can be used. In yet other arrangements, the frame assembly 22 itself can be constructed with integral components that are supported by the floor or other surface.

In the illustrated arrangement, a support standard 34 extends upward and rearward from a forward side of the motor housing 28. The illustrated standard 34 is connected to the frame assembly 22 at a forward side with treaded fasteners. Other connections also can be used. The standard 34 extends to a console 36 in the illustrated arrangement. As such, in the illustrated arrangement, the standard 34 extends upward and bends rearward to place the console 36 at a location generally rearward of the motor housing 28.

Advantageously, the illustrated standard 34 is a hollow member. Forming the standard 34 of a hollow tubular member decreases the overall weight of the treadmill 20. In addition, the hollow standard 34 can act as a wiring conduit such that wires can pass through the standard 34 between the console 36 and the motor housing 28. In another arrangement, the hollow standard 34 can be used as an air conduit to provide airflow to either the console 36 or to a user of the treadmill 20.

As illustrated in FIG. 1, a railing assembly 38 extends upward and forward from a portion of the frame assembly 22. The railing assembly 38 preferably is connected to a portion of the console 36 and can be connected to the console 36 in a manner that will be described in further detail below.

Figure 6:
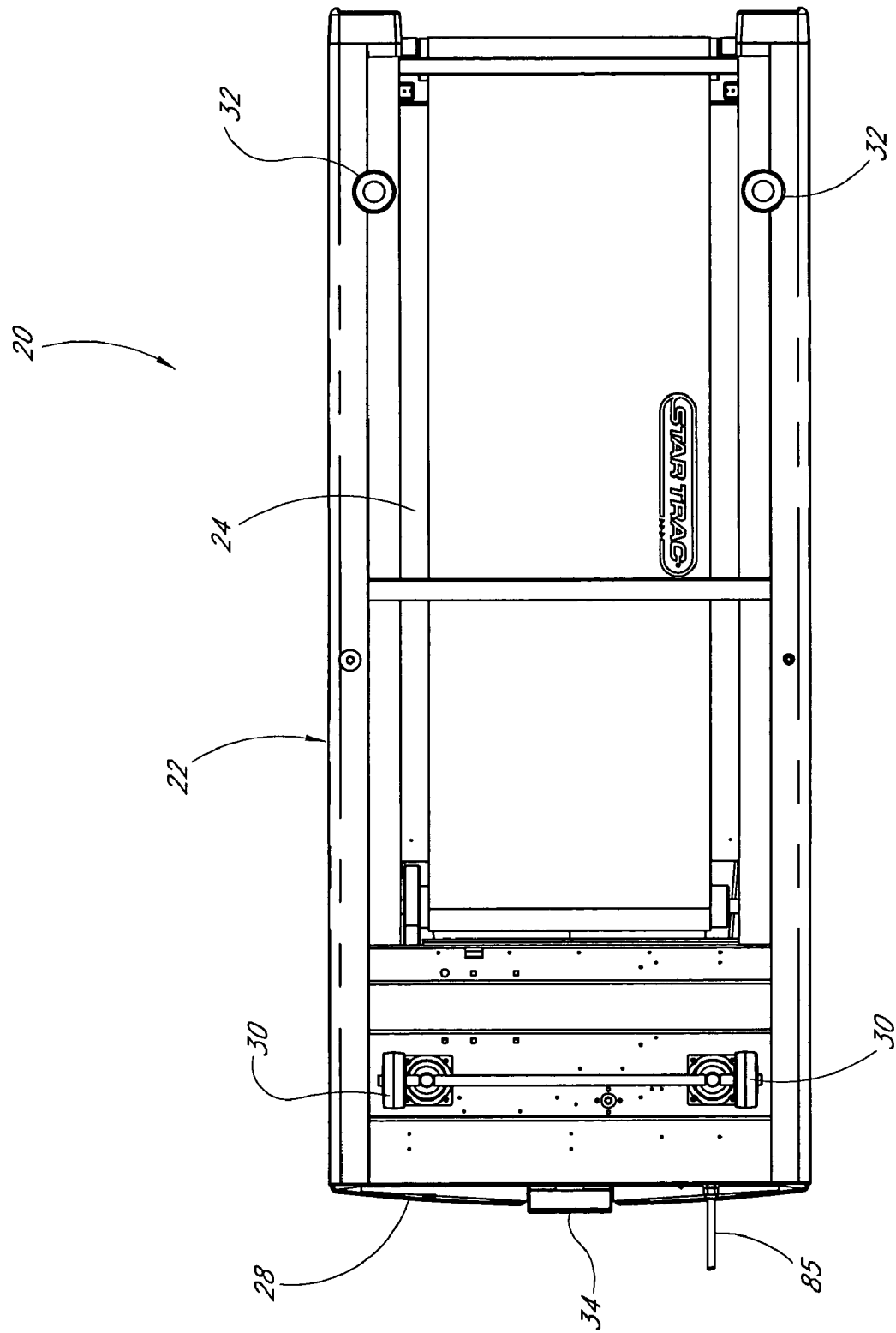
FIG. 6 is a bottom plan view of the treadmill of FIG. 1.
Figure 7:
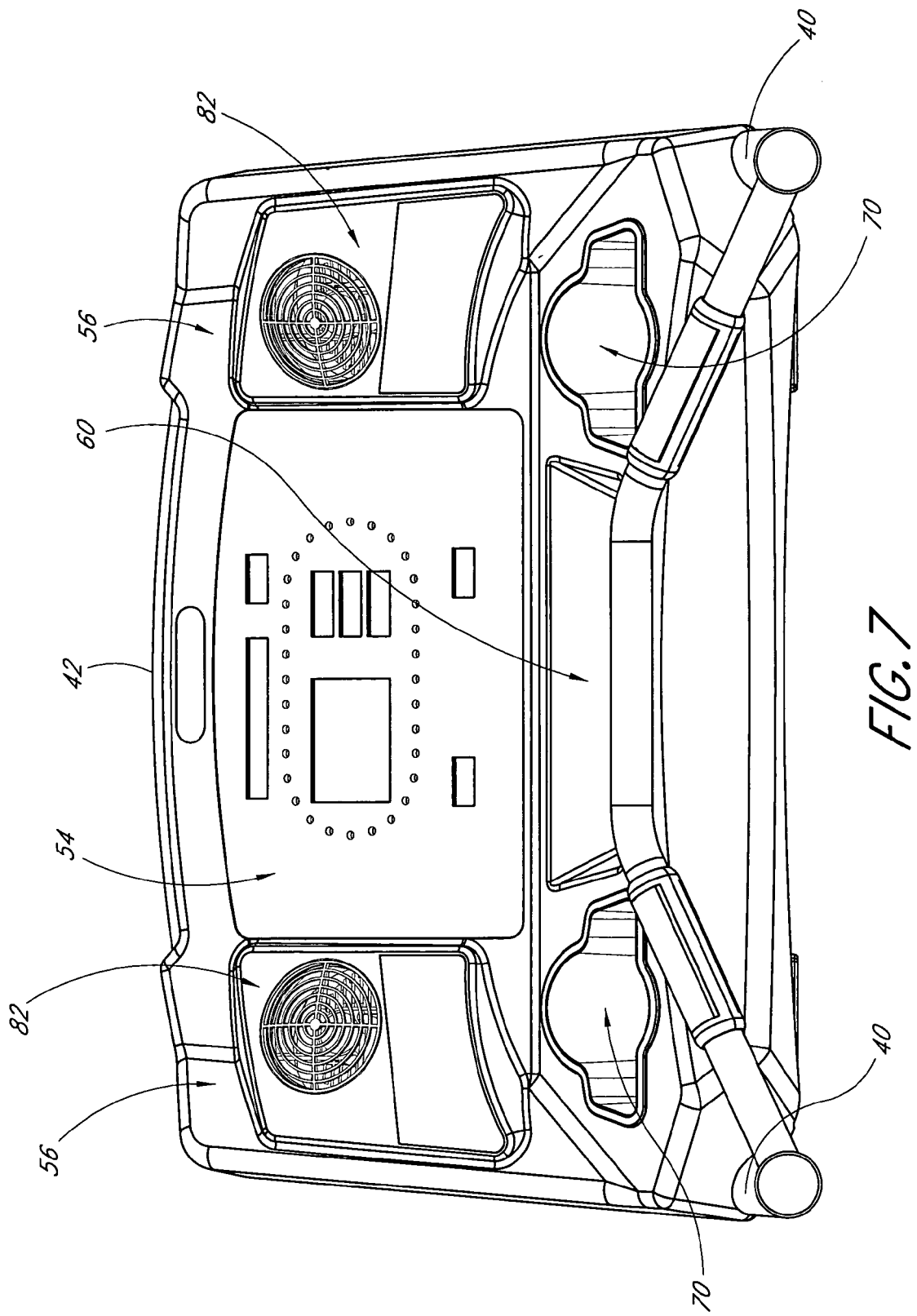
FIG. 7 is a user side view of a display console used with a treadmill, such as the treadmill illustrated in FIGS. 1-6, and arranged and configured in accordance with certain features, aspects and advantages of the present invention.
Figure 8:
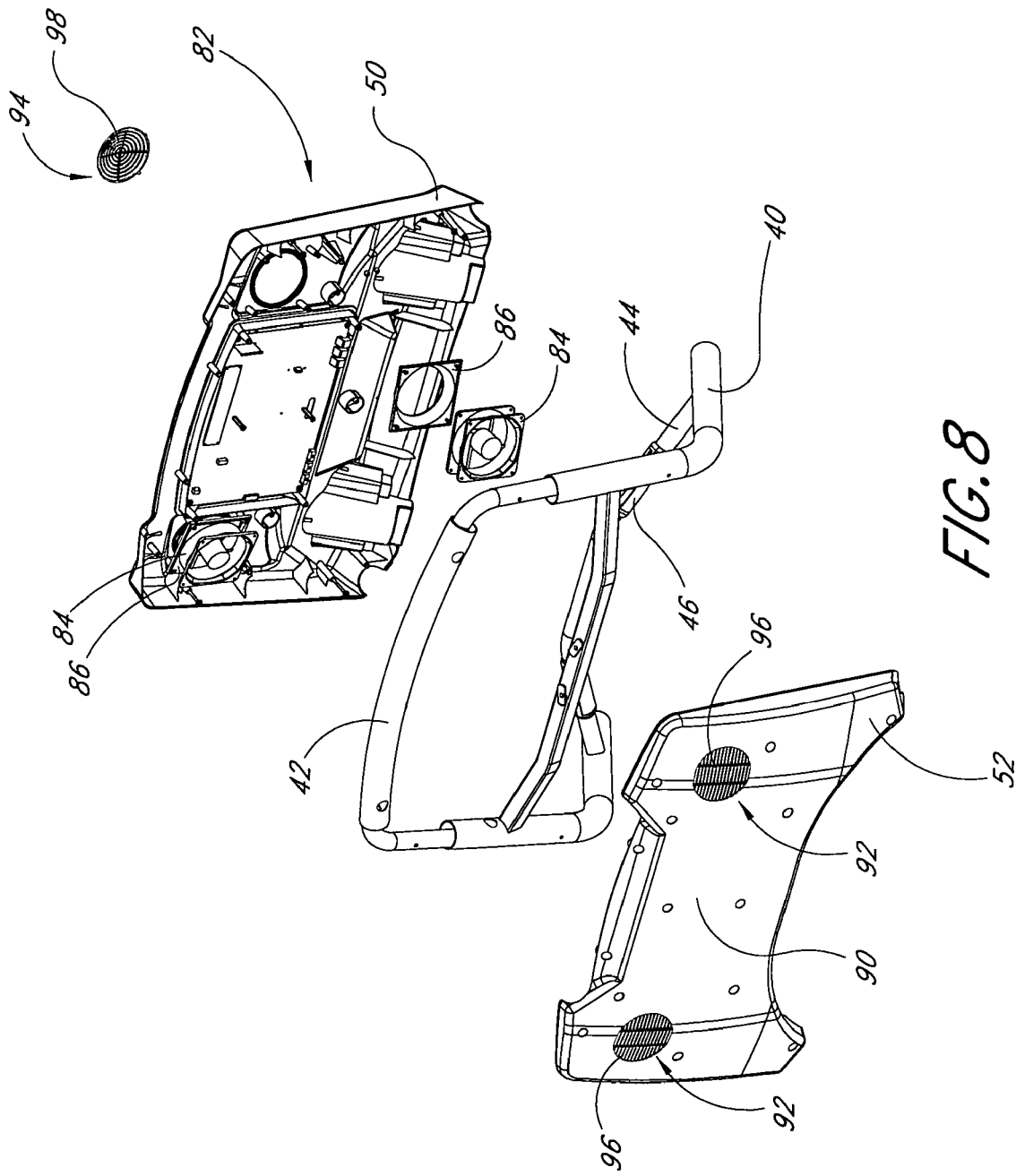
FIG. 8 is an exploded view of the display console showing a user cooling assembly that is integrated into the display console, which is arranged and configured in accordance with certain features, aspects and advantages of the present invention.
Figure 12B:
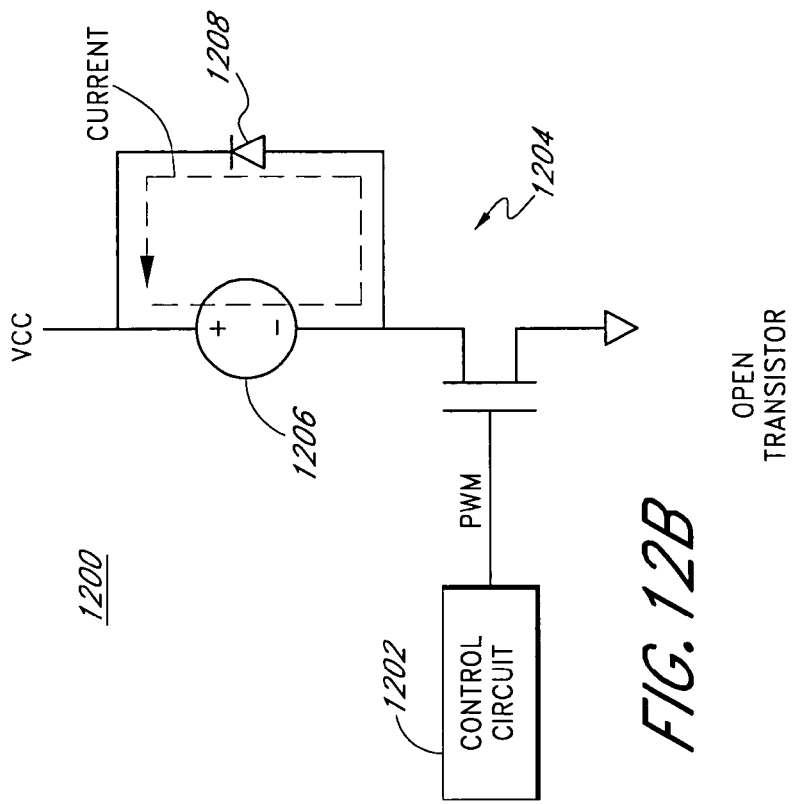
FIG. 12 is a simplified circuit diagram illustrating the use of pulse width modulation to control an electric motor in accordance with certain features, aspects and advantages of the present invention.
Figure 12A:
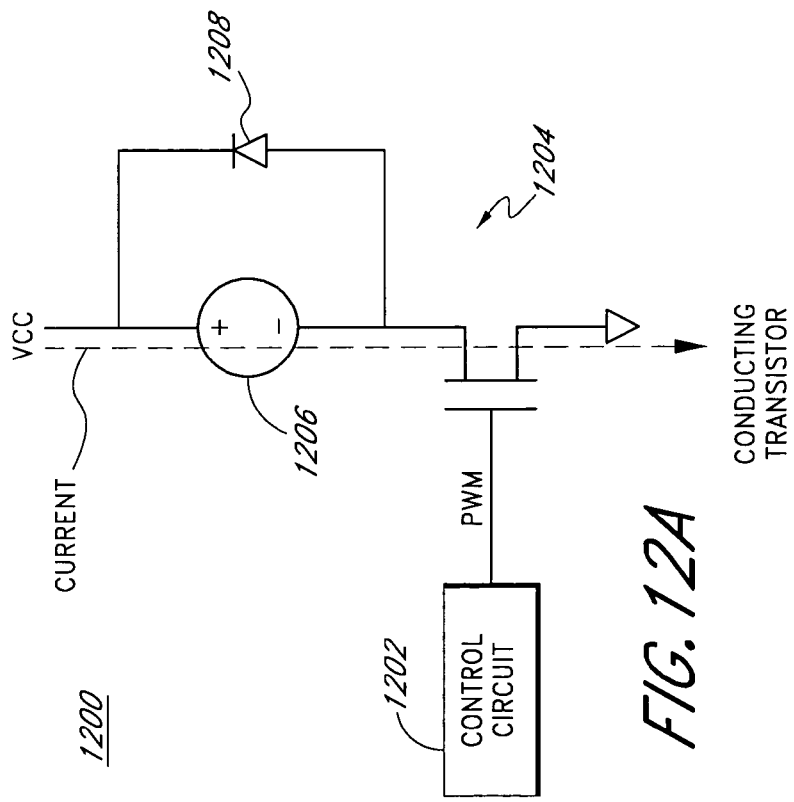

With reference now to FIG. 6, the railing assembly 38 preferably comprises a pair of handrails 40 (one shown) that extend upward from the frame assembly 22. The handrails 40 can be constructed of any number of components, depending upon the application. In addition, the illustrated handrails 40 extend slightly away from the console 38 while extending upward before turning toward the console 38. Such a construction allows greater breadth in the region commonly used during exercise.

The illustrated handrails 40 preferably are connected at a forward end by a cross-member 42. The cross member 42 can be integrally formed with the handrails 40 in some arrangements. The cross member 42 is exposed at an upper portion of the console 36 in the illustrated arrangement. As such, the cross member 42 defines a grab bar that can be gripped by a user during operation of the treadmill or during data input prior to using the treadmill, for instance. Preferably, this cross member 42 is disposed at about shoulder level or slightly below shoulder level for about 95 percent of the male population. In some arrangements, the cross member 42 can be disposed at about shoulder level or slightly below shoulder level for about 95 percent of the female population. Other heights also can be used depending upon the target user population.

The illustrated railing assembly 38 also comprises at least one handgrip 44 that extends inward from the handrails 40. Preferably, the handgrip 44 extends between the handrails 40 at a location between the user and the console 38. In some arrangements, the handgrip 44 can comprise sensors 46 to detect user pulse rates and the like. The illustrated handgrip 44 is positioned such that a user can easily grasp the handgrip 44 during operation of the treadmill. In one arrangement, the handgrip is at or above the waist level for about 95 percent of the female population. In another arrangement, the handgrip can be at or above the waist level for about 95 percent of the male population. Other heights can be used and the handgrip could be adjustable in height in some applications.

Figure 2:
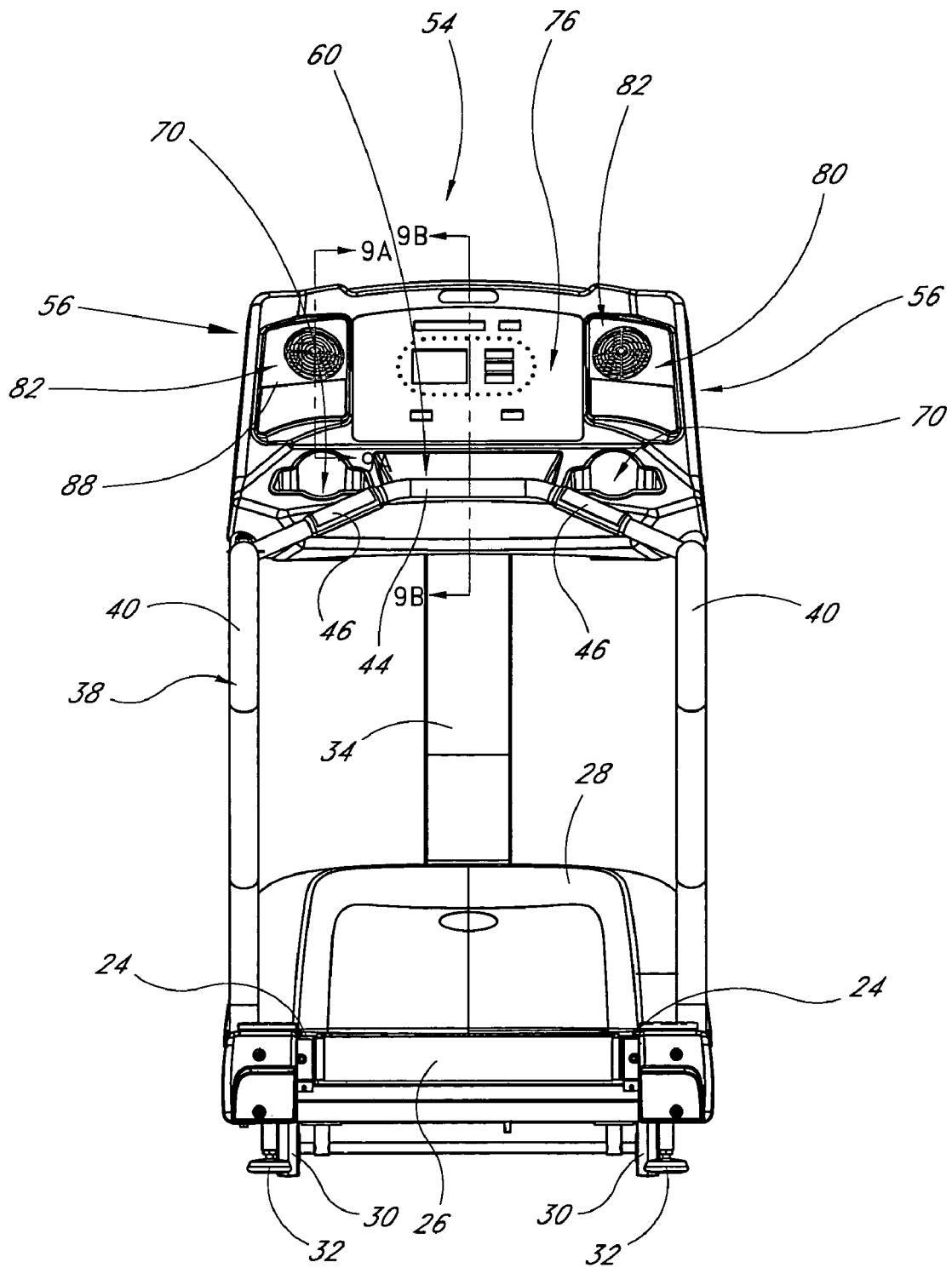
FIG. 2 is a rear elevation view of the treadmill of FIG. 1.
Figure 3:
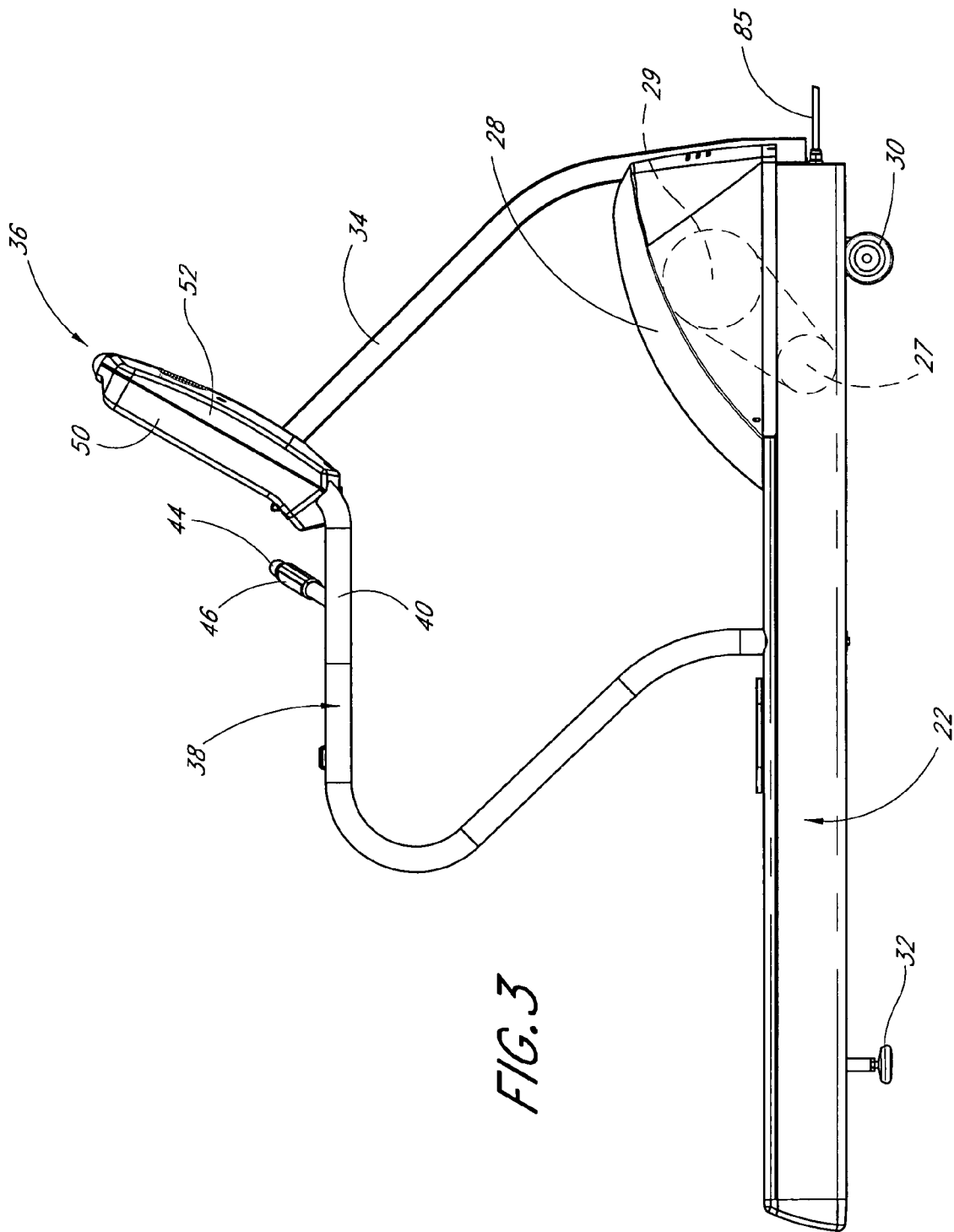
FIG. 3 is a right side elevation view of the treadmill of FIG. 1, which is substantially a mirror image of the left side elevation view.
Figure 4:
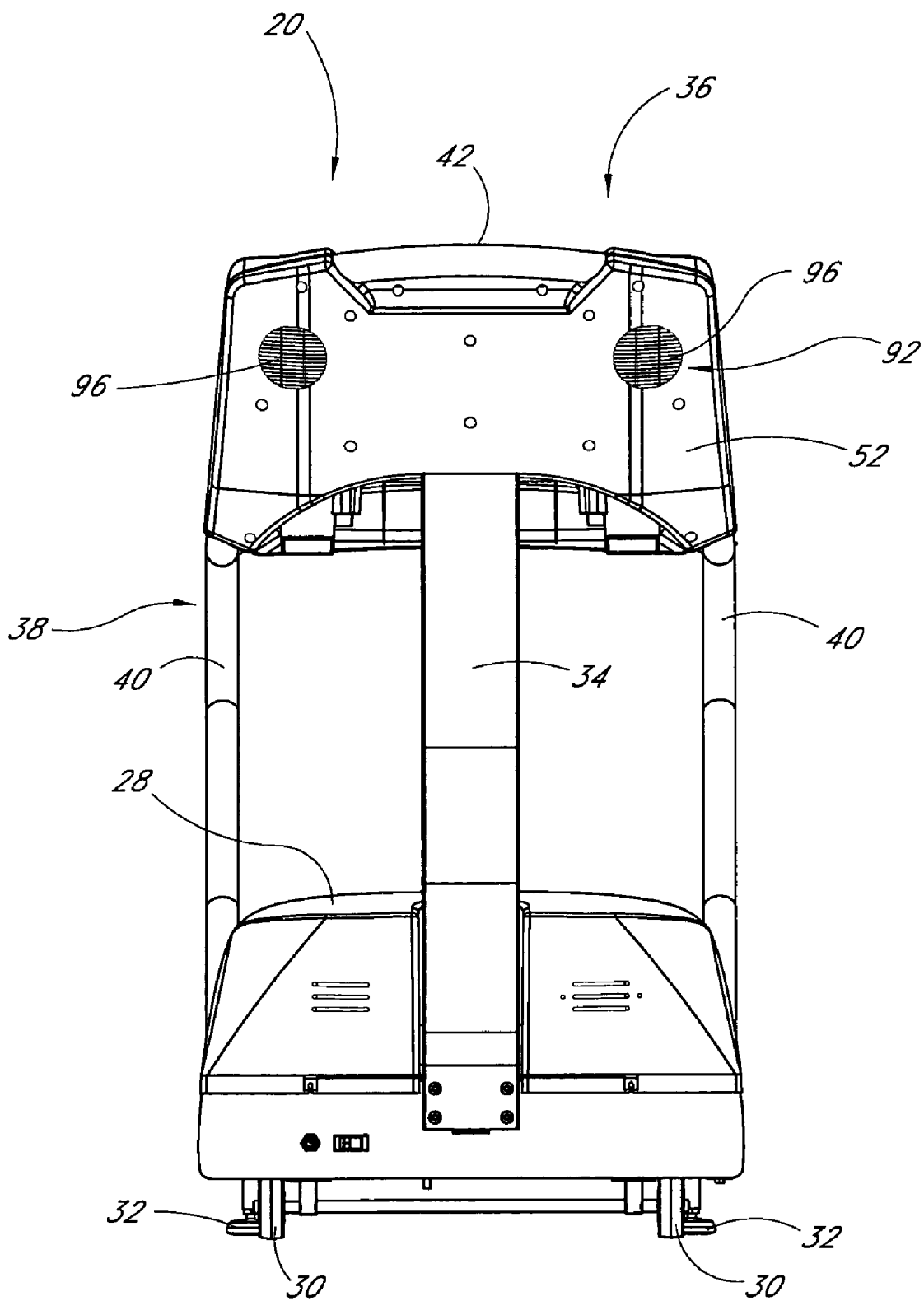
FIG. 4 is a front elevation view of the treadmill of FIG. 1.

With reference now to FIGS. 2 and 6, the console 36 will be described in greater detail. In general, the console 36 preferably is formed of a group of suitable plastic moldings. In the illustrated arrangement, an outer shell of the console 36 generally comprises a front piece 50 and a rear piece 52. While additional outer pieces can be used, reducing the number of pieces in the illustrated arrangement advantageously reduces manufacturing costs.

The two pieces 50, 52 can be attached together in any suitable manner. To ease disassembly for maintenance and the like, the two pieces 50, 52 preferably are attached using removable fasteners or mechanical interlocking components. Any such attachment arrangements can be used.

Moreover, in the illustrated arrangement, the console 36 is advantageously connected to the railing assembly 38 by capturing a portion of the railing assembly 38 between the two pieces 50, 52. More specifically, the illustrated cross member 42 is captured between the two pieces 50, 52 within a channel defined by pegs, fastener anchors or the like. Such an arrangement increases the support for the display while reducing the number of pieces used in assembling the exercise machine. Hence manufacturing and maintenance costs can be reduced.

In the illustrated arrangement, the console 36 preferably is slightly concave on the face directed toward the user. As such, the console 36 advantageously comprises a center section 54 and a pair of side wing portions 56 with the center section 54 being recessed away from the user. The side wing portions 56 are provided on separate sides of a generally longitudinally extending center plane CP. The side wings 56 preferably are angled relative to the center section 54 such that an included angle of between about 5° and about 25° is defined between the center section 54 and the side wings 56. In one arrangement, the included angle is between about 10° and about 15°. In a particularly preferred arrangement, the included angle is about 10°.

In addition, the illustrated console face is angled relative to a generally vertical transverse plane V in the illustrated arrangement. In one arrangement, this angle is between about 15° and about 45°. In another arrangement, this angle is between about 20° and about 40°. In one particularly advantageous arrangement, this angle is about 30°. In some arrangements, the console 36 generally is disposed between the waist level of about 95 percent of the female population and the head level of about 95 percent of the male population. Other heights also can be used depending upon the application.

With reference now to FIG. 1, the console 36 also comprises an elongated accessory holder 60. In the illustrated arrangement, the accessory holder 60 is integrally formed with the center section 54. The accessory holder 60 preferably comprises a recessed pocket that is sized as desired. In one arrangement, the accessory holder 60 has a length such that a book or magazine can be easily held within the accessory holder 60. Accordingly, in such an arrangement, the accessory holder 60 can have a length between about 8" and about 14". In one preferred arrangement, the accessory holder has a length of about 9.7". Preferably, the accessory holder 60 has a slightly angled front lip 62 relative to a rear wall 64 of the accessory holder 60.

Figure 5:
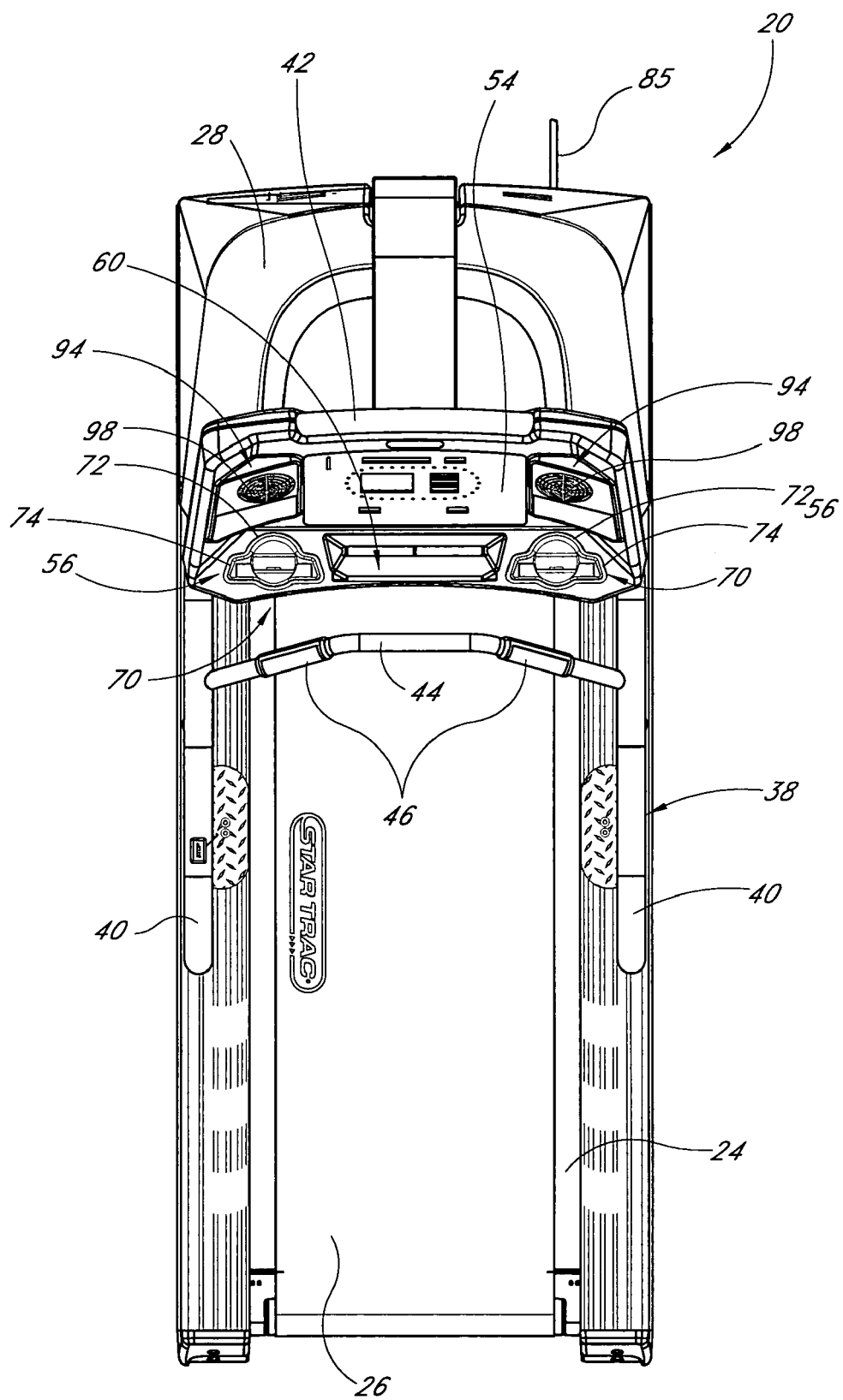
FIG. 5 is a top plan view of the treadmill of FIG. 1.

With continued reference to FIG. 1 and with additional reference to FIG. 5, a pair of smaller accessory holders 70 are disposed to the sides of the accessory holder 60. The smaller accessory holders 70 preferably are positioned on the side wings 56. In one arrangement, the smaller accessory holders 70 are shaped to accept a variety of items having differing cross-sectional profiles. For instance, with references to FIG. 5, the accessory holders 70 comprise a rounded generally cylindrical portion 72 and a slot portion 74 that intersect. As such, the illustrated accessory holders 70 can accept rounded articles (e.g., cans, bottles, etc.) and more square articles (e.g., personal data assistants, wallets, cellular telephones, etc.). In some particularly preferred arrangements, data transfer ports and power ports can be provided in the accessory holders 60, 70, or adjacent thereto, such that a personal data assistant, cellular phone or the like can communicate with the data port, allowing for transfer of data between the personal data assistant and a control unit of the exercise machine or other electronic component (e.g., to provide streaming audio, video, interactive information or the like) or to allowing charging of such electrical devices. A system for providing infrared data transfer will be described in greater detail below.

It should be noted that while the adjective smaller is used with respect to the illustrated accessory holders 70, this term should not suggest that these accessory holders 70 must be smaller than another accessory holder. Any relative sizing of the accessory holders can be used as desired.

The illustrated console 36 preferably also comprises one or more information display arrangements 76. The information display arrangements 76 can take any suitable configuration. For instance, in some arrangements, the information display arrangement 76 can include light bars (e.g., LED lamps in a line). In other arrangements, the information display arrangement 76 can include a display screen (e.g., a liquid crystal panel or the like). The information display arrangement can be used to form a portion of a user interface. The user interface allows a user to input information and to receive information. Many such interfaces are well known.

With reference now to FIG. 2, the illustrated treadmill 20 advantageously comprises an integrated user cooling system 80. The cooling system 80 comprises at least one fan assembly 82 that is mounted to the treadmill at a location above the base structure of the treadmill (e.g., at the console 36). By positioning the fan assembly 82 at a location above the base structure of the treadmill, the fan assembly 82 is closer to the head and upper body region of a user. Such a location decreases the flow rate of air that needs to be achieved in order for adequate cooling to be achieved.

In the illustrated arrangement, two fan assemblies 82 are provided, with one fan assembly 82 being mounted in each of the side wing portions 56. As described above, the illustrated console 36 is advantageously angled such that the height and the angles result in a straight airflow vector AF toward a user's upper body and/or head region. Other consoles designs (e.g., differing heights and/or angles) can be used and the fans can be angled relative to the console accordingly. The illustrated arrangement, however, has been designed for a unique appearance while maintaining a suitable relationship between the fans and the user.

The fan assembly 82 generally comprises a blower or fan 84 that preferably is electrically connected to a power source of the exercise machine through a controller circuit as disclosed with reference to FIGS. 12-16. Alternatively, the fan 84 can be connected to a power supply that is fed by a power cord 85 used to supply power to the control system or motor of the treadmill. In other arrangements, if the treadmill 20 comprises a generator, the fan 84 can be driven by electrical power supplied by the generator. Such electrical connections reduce the number of plugs that must be accommodated by a gym or home for use of the machine.

The fan 84 can be any suitable type of fan (e.g., tube axial fan, centrifugal fan, vane axial fan). In the illustrated arrangement, a tube axial fan is used. With reference to FIG. 9A, the fan 84 preferably is encased within the console 36. More preferably, the fan 84 is positioned within ducting 86 in a manner that reduces or eliminates airflow through a cavity defined within the console 36 outside of the ducting 86. In the illustrated arrangement, the ducting 86 comprises a rubber duct section 87 and the housing of the tube axial fan. In this arrangement, a portion of the ducting 86 also comprises a portion 89 of one of the pieces 50, 52 of the outer shell of the console. Other suitable ducting arrangements can be used. Advantageously, the fan 84 is disposed between a portion of the rear piece 52 of the console 36 and the ducting 86 and the two components can be used to support the fan 84 such that assembly and maintenance can be simplified. In one alternative arrangement, the fan 84 and the ducting 86 can be unitarily formed such that fewer components are used in the construction of the cooling system 80.

The ducting 86 advantageously extends between a user surface 88 of the console 36 (i.e., a surface that faces the user during operation) and another surface that does not face the user during operation. In one advantageous arrangement, the ducting 86 extends straight through the console 36 between the user surface 88 and a back surface 90. In another arrangement, the ducting 86 is bent such that the ducting 86 extends between the user surface and a side surface of the console 36. Preferably, an inlet to the fan assembly 82 and an outlet to the fan assembly are positioned to reduce recirculation of air from the outlet to the inlet. In the illustrated arrangement, such a recirculating restriction is achieved by positioning the inlet 92 on the back surface 90 and the outlet 94 on the user surface 88.

Preferably, both the inlet 92 and the outlet 94 are covered by respective grills 96, 98. In some arrangements, the outlet 94 can be covered by a flow directing assembly or component, such as louvers or the like. By properly angling the surfaces of the console 36 about the outlet 94, the angling of the airflow is simply achieved. In some arrangements, a nozzle or gimbal arrangement can be used to further enhance directional control. In the illustrated arrangement, the angle of the ducting and the restriction defined by the ducting 86 are used to direct a focused stream of air toward an upper portion of a user's body when positioned for use on the illustrated treadmill.

With reference now to FIGS. 10 and 11, a display electronics assembly 100 is illustrated in simplified form. This assembly 100 is one presently preferred construction of at least a portion of the display arrangement 76. The illustrated display electronics assembly 100 generally comprises a keypad panel 102, a display panel 104 and an electronics panel 106. The three panels 102, 104, 106 are placed together in a suitable manner. In the illustrated arrangement, the keypad panel 102 and the display panel 104 generally abut each other while the display panel 104 is offset from the electronics panel 106 by standoffs 108. Such an arrangement facilitates cooling of the electronics panel 106. Threaded fasteners 110 or other suitable connection mechanisms can be used to secure the panels 102-106 together.

The electronics panel 106 preferably comprises connectors used to supply power and used to transfer information between the display electronics assembly 100 and a controller of the treadmill 20. Suitable electrical conduits (e.g., wires and connectors) can be used to place the electronics panel 106 in electrical communication with the controller. In some arrangements, infrared or other arrangements (e.g., not hardwired connections) can be used.

Advantageously, the display electronics assembly 100 can be fitted to and removed from the console 38 by simply removing a fastening assembly and unplugging any wires that connect the display electronics assembly 100 to the controller. In the illustrated arrangement, the display electronics assembly 100 is secured in position using standoffs 114 and threaded fasteners 116. Other mechanical connection arrangements can be used. The illustrated arrangement, however, advantageously simplifies replacement of a faulty display assembly 100 and eases maintenance.

With reference now to FIGS. 12-16, a control circuit 1202, such as, for example, a fan controller board 1300, is illustrated therein. FIGS. 12A-12B illustrate a simplified circuit diagram 1200 comprising a control circuit 1202, a transistor 1204, an electric motor 1206, and a flyback diode 1208. As shown in FIGS. 12A-12B, the control circuit 1202 outputs a pulse width modulated (PWM) drive signal to switch the transistor 1204 on and off (conducting and open), thereby effectively toggling the activation of current through the circuit. The control circuit 1202 turns on the current by switching the transistor 1204 to a conducting circuit for a brief instant, defined by the duty cycle of the PWM drive signal, as shown in FIG. 12A. Each instant can be less that the time it takes for the current through the motor to reach its peak inrush current, then the controller circuit 1202 shuts the current off by switching the transistor 1204 to an open circuit. Since the motor 1206 cannot stop instantaneously, the flyback diode 1208 allows the current to keep flowing, as shown in FIG. 12B. Before the current dissipates, the next pulse turns current back on and gives the motor 1206 another boost. The more the current is conducting, or the greater the duty cycle of the PWM drive signal, the more energy the motor 1206 receives and the faster it turns. Accordingly, through the use of the PWM drive signal, the control circuit 1202 effectively and efficiently controls the inrush current as well as the steady state speed of the fan.

Figure 13:
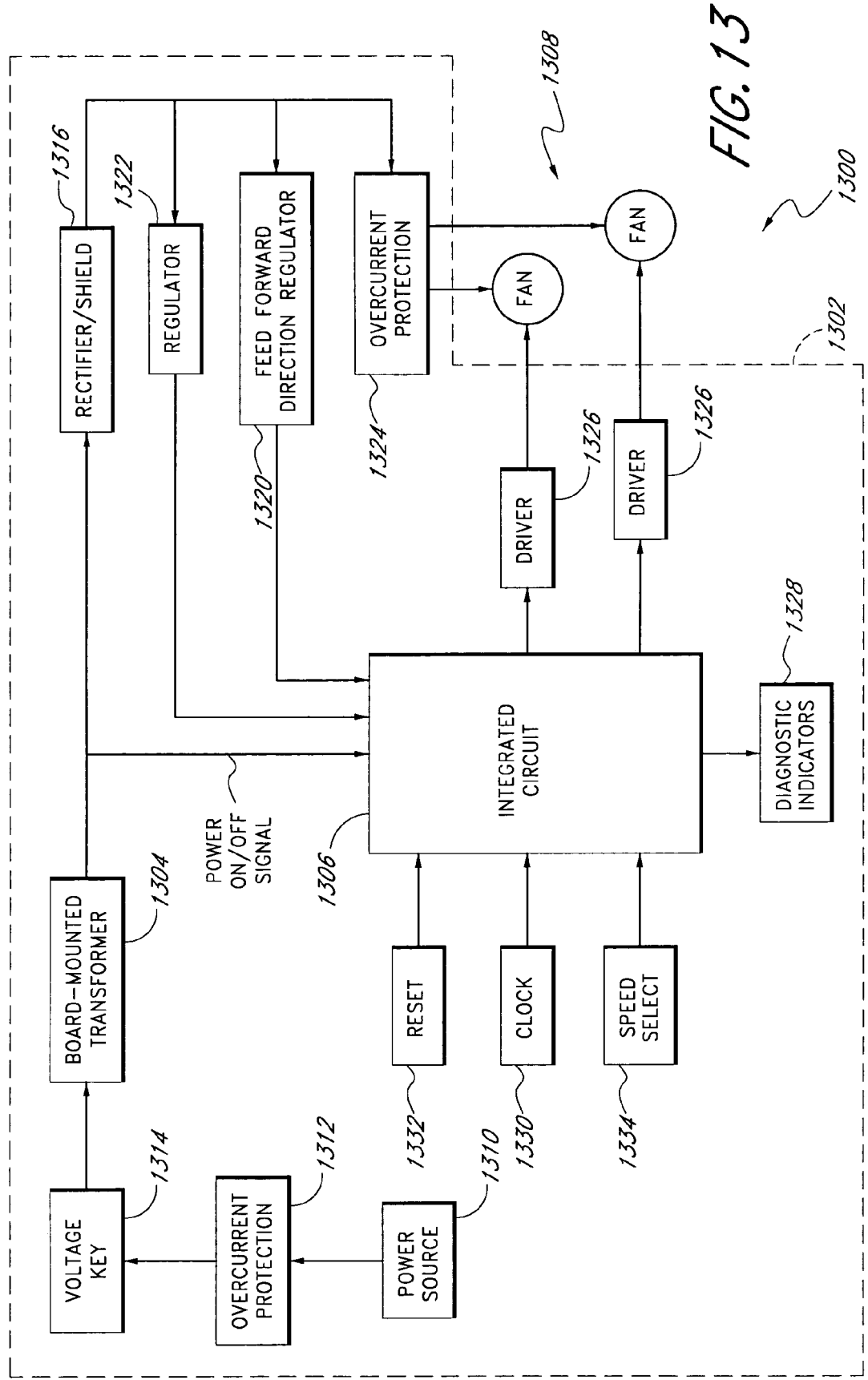
FIG. 13 is a block diagram of a fan controller board that has been arranged and configured in accordance with certain features, aspects and advantages of the present invention.

FIG. 13 is a block diagram of an embodiment of the control circuit 1202 of FIG. 12, where the control circuit 1202 comprises a fan controller board 1300. As shown in FIG. 13, according to one embodiment, the fan controller board 1300 advantageously comprises a printed circuit board (PCB) 1302 having a board mounted transformer 1304 supplying power to an integrated circuit 1306, which in turn provides an output drive signal to one or more fans 1308, as will be described.

As shown in FIG. 13, the board 1300 preferably receives power from the power source 1310. In one arrangement, the power source 1310 may comprise 110 volt or 220 volt AC power, such as that available in commercial and residential buildings. The board 1300 can be protected from abnormal behavior in the power source 1310 by an overcurrent protection 1312. According to one embodiment, the overcurrent protection 1312 comprises normal or self-resetting fuses that interrupt current above the tolerances of the board 1300.

Advantageously, a voltage key 1314 configures the application of power from the power source 1310 to the board mounted step down transformer 1304 to provide isolation and to lower incoming line voltage. For example, the voltage key 1314 preferably configures the wiring through primary windings of the transformer 1304 differently depending upon whether the power source 1310 comprises 110 or 220 volts, as discussed below with reference to FIG. 15. According to one embodiment, the transformer 1304 is of sufficiently light weight that its mounting will not cause the PCB 1302 to deflect, potentially causing open or short circuit conditions because of brittle or broken traces. Moreover, the transformer 1304 includes characteristics voiding the need for special isolation chambers, electromagnetic interference (EMI) shields, or the like. For example, according to one embodiment, the transformer 1304 meets regulations required for devices used in residential buildings, such as, for example, a Class B transformer such as those commercially available from MCI Transformer Corporation of Willits, Calif., or the like. Because a transformer meeting the foregoing recitations is preferred, the transformer 1304 may have tolerance levels near or below that specified for driving the one or more fans 1308 of the personal cooling system of the exercise machine.

In the illustrated arrangement, the output of the transformer 1304 is supplied to the integrated circuit 1306 and a rectifier/EMI shield 1316. The integrated circuit 1306 advantageously comprises one or more of a microprocessor, EEPROM, logic gates, ROM, RAM, flash memory, dedicated controllers, combinations of the same, or the like. The integrated circuit 1306 receives inputs from the user and various components of the board 1300. The integrated circuit 1306 also generates outputs to drive the one or more fans 1308 of the personal cooling system. The integrated circuit 1306 also can activate or change the color of one or more diagnostic indicators or fan speed indicators, as will be discussed with reference to FIGS. 14-16. According to one embodiment, the integrated circuit 1306 comprises a Motorola PIC16C711-04 integrated circuit, which includes control logic and/or program instructions for accepting the inputs and generating the appropriate outputs, as discussed herein.

As shown in FIG. 13, the output of the illustrated transformer 1304 is supplied to the integrated circuit 1306, which uses the output to determine whether power is being continually supplied to the board 1300. Also, the rectifier/EMI shield 1316 converts the low AC voltage from the illustrated transformer 1304 to unregulated DC voltage and provides a shield against EMI.

As shown in FIG. 13, the unregulated DC voltage output from the rectifier/EMI shield 1316 is used to power the one or more fans 1308, as an input to a feed forward direction regulator 1320, and as an input to the DC power regulator 1322, whose output is used to power the illustrated integrated circuit 1306. In one arrangement, the direction regulator 1320 provides a signal to the integrated circuit 1306 indicating whether the unregulated DC voltage is likely to cause the fans 1306 to run backward, fail to start, or the like. In another arrangement, the direction regulator 1320 comprises one or more resistor values providing a predetermined voltage to the integrated circuit 1306 used to determine whether voltage polarity is correct.

As disclosed, the unregulated DC voltage output from the rectifier/EMI shield 1316 also can be used to power the one or more fans 1308. Before powering the fans 1308, the unregulated voltage passes through resetable overcurrent protection 1324. In one arrangement, the protection 1324 includes one or more resetable fuses, such as, for example, one or more polyswitches, which generally protect the circuit from the fans 1308 drawing more current than can be tolerated by the transformer 1304.

In one arrangement, the fans 1308 comprise DC brushless motor fans, such as those commercially available from Delta Electronics. However, AC motor fans, other brush or brushless fans, squirrel cage fans, combinations of the same, or the like can be used to move air to the user.

FIG. 13 also shows the integrated circuit 1306 producing the PWM drive signals, which are forwarded through drivers 1326 to the fans 1308. The drivers 1326 may comprise resistors designed to show voltage levels desired by switching transistors, such as those disclosed with reference to FIG. 12, other switching mechanisms, or the like. The integrated circuit 1306 also outputs a signal or signals to one or more diagnostic indicators 1328. According to one embodiment where the diagnostic indicators 1328 comprises LEDs and multi-colored LEDs, the signal or signals cause the LEDs to energize or change color when certain diagnostic conditions occur. For example, when a user of the exercise machine activates the personal cooling system, the user may select between settings for the speed of the fans 1308. In one embodiment, the diagnostic indicators 1328 may indicate the selected speed. Moreover, the diagnostic indicators 1328 can indicate when the direction regulator 1320 has detected an invalid polarity in the DC voltage, or when one or more of the fans 1308 malfunctions.

The integrated circuit 1306 also accepts a clock input 1330, internal or external resets 1332, and a speed select 1534 indicating a user-selected speed setting of the fans 1308. According to one embodiment, the clock input 1330 comprises a 4 MHz clock signal. The reset 1332 can include a power up internal reset used to reset the integrated circuit 1306 when power is first applied to the board 1300, a manual reset available to the user by, for example, the console 36, the information display arrangements 76, a maintenance switch or button on the PCB 1302 itself, combinations of the same or the like.

The speed select 1334 may advantageously be user selected by, for example, one or more switches, buttons, knobs, touch screen, keyboards, or other input mechanism from the console 36 or information display arrangements 76. For example, the integrated circuit 1306 may receive one or more bits of data indicating the desired speed of the fans of the personal cooling system. For example, one embodiment may include the speed-indicating truth table of Table 1.

TABLE 1

| BIT 1 | BIT 0 | RESULT |
|---|---|---|
| 0 | 0 | OFF |
| 0 | 1 | LOW |
| 1 | 0 | HIGH |
| 1 | 1 | OFF |

FIG. 13 also shows the drivers 1326 and the over current protection 1324 being electrically connected to the fans 1308, which may be remotely located from the PCB 1302. For example, according to one embodiment, the PCB 1302 advantageously installs in the motor housing 28 near a motor controller board (not shown). The PCB 1302 is then connected to, for example, the fans 1308 located in the console 36, a user input mechanism such as the information display arrangements 76, or the like, through, for example, wiring in the standard 34. Such design allows for straightforward maintenance as the controller board 1300 can advantageously be accessed, for example, near the motor control board of the treadmill.

Based on the foregoing disclosure, the fan controller board 1300 advantageously powers the fans 1308 through use of the integrated circuit 1306. Such use provides for future adaptability in that a change to, for example, the fans 1308, may affect only a need for revised software instructions or logic in the microprocessor 1306. Moreover, the voltage key, which allows the control circuit to be powered by varied power supplies, provides ease of adaptability in differing power supply systems.

Figure 14:
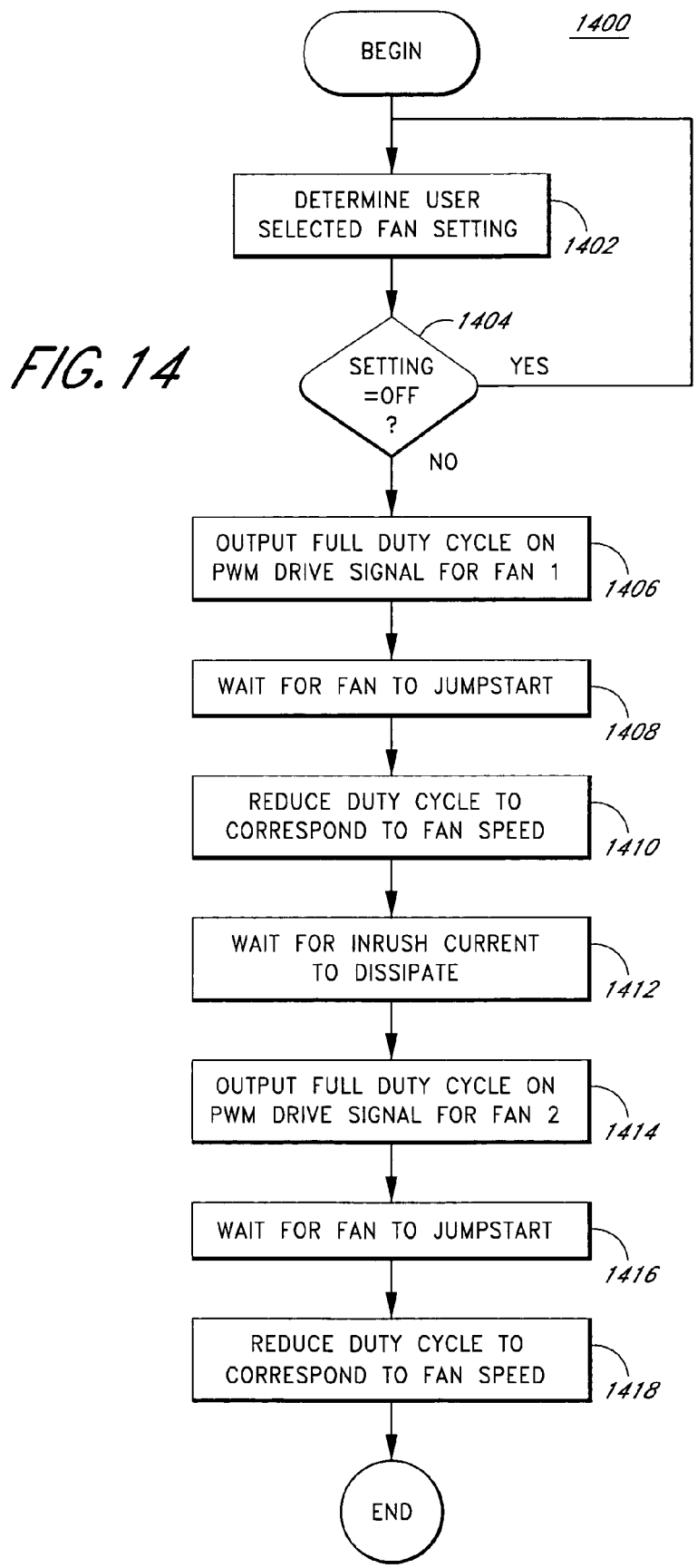
FIG. 14 is a flow chart of a powering on process that is arranged and configured in accordance with certain features, aspects and advantages of the present invention.

FIG. 14 is a flow chart of an exemplary powering on process 1400, used to power on the presently preferred fans 1308 without exceeding the tolerance levels of the presently preferred transformer 1304. As shown in FIG. 14, the process 1400 includes block 1402 where the integrated circuit 1306 determines the user-selected fan setting. As disclosed in the foregoing, the speed may include an actual speed of rotation, an airflow measurement, comparative flow levels like "LOW," "HIGH," "SLOW," "FAST," "FASTER," "FASTEST," combinations of the same, or the like. According to one embodiment, the user selects the setting for his or her personal cooling system as "OFF," "LOW," and "HIGH," from, for example, the console 36 or one of the information display arrangements 76. The integrated circuit 1306 receives the user selection, and at block 1404, the integrated circuit 1306 determines whether the user has selected "LOW" or "HIGH." When the user has selected neither and desires the personal cooling system to be off, the process 1400 returns to block 1402. When the user has select "LOW" or "HIGH," the integrated circuit 1306, at block 1406, outputs the PWM drive signal at full duty cycle to the first of the fans 1308. According to one embodiment, the integrated circuit 1306 may synchronize the PWM drive signal to the AC power from the power source 1310, such as, for example, using a PWM drive signal of 60 or 50 Hz. The integrated circuit 1306 then waits for the fans 1308 to be jumpstarted by the heavy duty cycle. According to one embodiment, the integrated circuit 1306 waits approximately 200 ms, After the jumpstart, the integrated circuit 1306 reduces the duty cycle to correspond with the user selected fan speed. For example, according to one embodiment, a "LOW" speed setting corresponds to around a forty percent (40%) duty cycle, while a "HIGH" speed setting corresponds to around an eighty percent (80%) duty cycle. According to another embodiment, the "LOW" speed setting can range between about 30% and about 50% duty cycle and the "HIGH" speed setting corresponds can range between about 70% and about 90% duty cycle. In addition, the "FULL" duty cycle used to jumpstart the fans can correspond to about a one hundred percent (100%) duty cycle. However, a lower percentage duty cycle can be used to jumpstart the fans. The duty cycle also may vary based on the fan design specifications and manufacturer, may include one, two, or more speed settings, settings for each fan, combinations of the same or the like.

Because the duty cycle of the PWM drive signal is generated by the integrated circuit 1306, the entire board 1300 is advantageously very modular in design. For example, were a design change made to the personal cooling system such that a different fan is used in the system, such as, for example, a squirrel cage fan or a fan by a different manufacturer, an entire redesign of the control circuit is not needed. Rather, a straightforward update to the software and/or logic of the integrated circuit 1306 can accomplish the change, such as, for example, an update associating new duty cycles of the PWM drive signal with the user selected speed settings. In one embodiment, such an update will account for the inrush current of the newly used fans, a desired cooling effect determined by a user or the like.

After reducing the duty cycle, the integrated circuit 1306 at block 1412 waits for the inrush current associated with powering on the first fan to dissipate to a point where another inrush current for jumpstarting another fan, added to the current being used by any already running fans, still does not exceed the tolerances of the transformer 1304. According to one embodiment, the wait takes into account the greatest current draw, for example, the duty cycle of around 80%, and waits approximately 2.5 s, however, the delay can vary to meet any number of operational or other desired parameters. Thereafter, in steps 1414-1418, the integrated circuit 1306 jumpstarts the next fan and reduces its duty cycle to the steady state.

Although the powering on process 1400 is disclosed with reference to its preferred embodiment, this feature is not intended to be limited thereby. Rather, a wide number of alternatives can be used for powering on the fans 1308 without exceeding the tolerances of the board 1300. For example, the integrated circuit 1306 may interleave the powering on the of the fans, power the fans up as soon as there is sufficient current, use delays specifically associated with each user selected speed setting of each fan, combinations of the same, or the like. Two such examples illustrating potential steps of exemplary duty cycles being powered on are shown in Table 2.

TABLE 2

| EXAMPLE 1 | | EXAMPLE 2 | |
|---|---|---|---|
| FAN 1 | FAN 2 | FAN 1 | FAN 2 |
| 1 30% | 2 30% | 1 30% | 4 30% |
| 3 50% | 4 50% | 2 50% | 6 50% |
| 5 70% | 6 70% | 3 70% | 7 70% |
| 7 80% | 8 80% | 5 80% | 8 80% |

As disclosed in the foregoing, use of the integrated circuit 1306 advantageously allows for a wide variety of more complex to more straightforward embodiments of powering on the fans 1308, in a way that does not exceed the tolerances of components of the board 1300.

Figure 15:
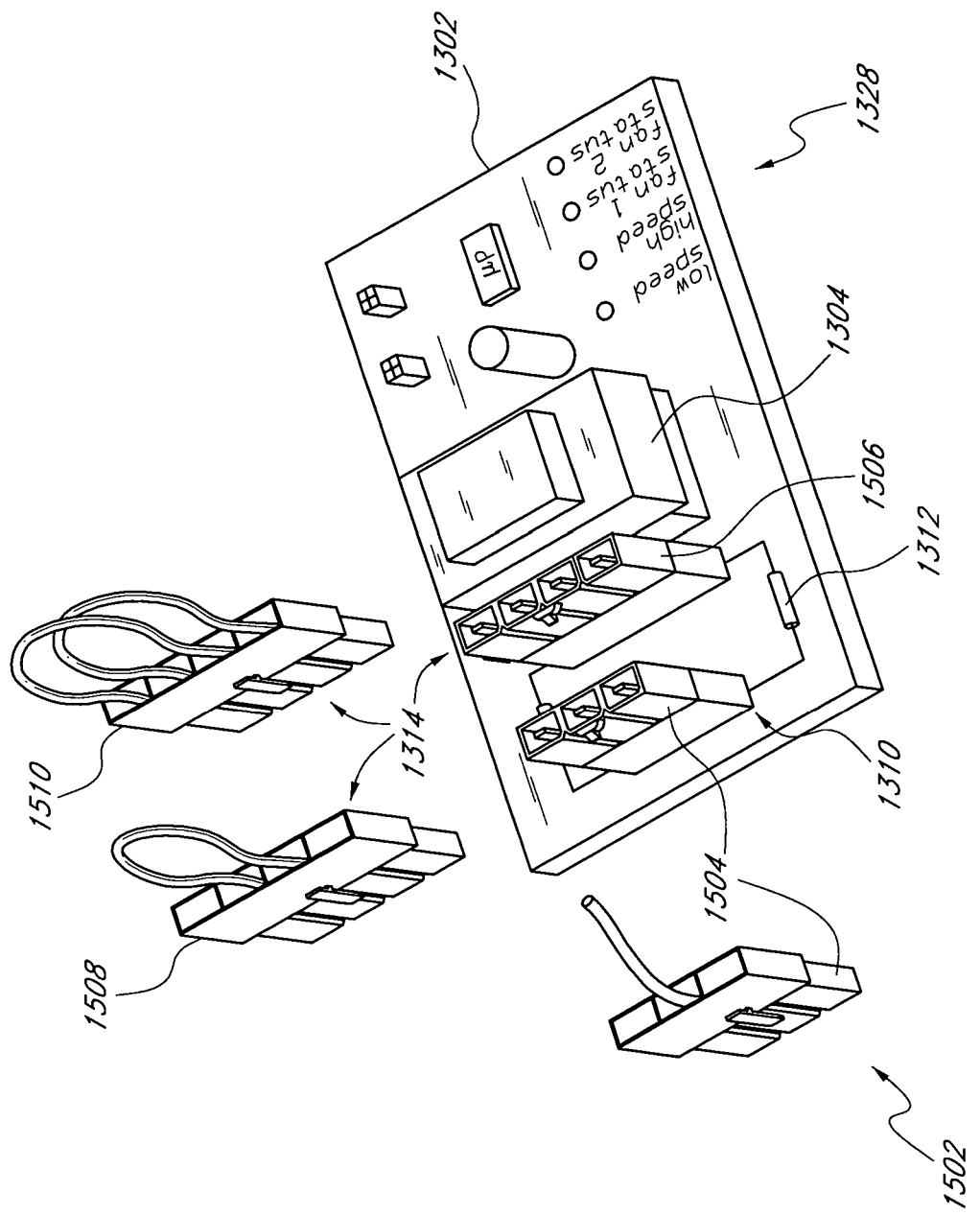
FIG. 15 is a simplified perspective view of the fan controller board of FIG. 13, which is arranged and configured in accordance with certain features, aspects and advantages of the present invention.

FIG. 15 is a simplified perspective view of the fan controller board 1300 of FIG. 13. As shown in FIG. 15, the board 1300 includes the PCB 1302 along with the other components disclosed with reference to FIG. 13. FIG. 15 also highlights the modular design aspects of various embodiments disclosed herein, including components of the power source 1310, components of the voltage key 1314, and the on-board diagnostics indicators 1328. For example, according to one embodiment, the power source 1310 includes a power cable 1502 that connects to the PCB 1302 through mating portions of a connector 1504. The power cable 1502 can connect to one or more other electrical components, such as, for example, a motor controller board. Connection from a motor controller board advantageously allows the power source 1310 to connect to power, such as AC power, which has been filtered to reduce, for example, power spikes, harmonics, or the like. Alternatively, power cable 1502 may connect to traditional residential or industrial power outlets.

FIG. 15 also shows an embodiments of the voltage key 1314 including a receptacle 1506 and two electrically mating plugs 1508 and 1510. As disclosed with reference to FIG. 16, the voltage key 1314 configures the wiring connected to the primary side of the transformer 1304. According to one embodiment, a 220 volt plug 1508 includes about 22 or 12 AWG gauge wire sturdily connected to contact leads within the plug 1508, thereby configuring the transformer 1304 such that the magnetic flux is complementary for the primary windings. Moreover, such configuration provides for ease of maintenance and configurability for users of the exercise machine. For example, the wire is looped such that one or more fingers are easily hooked through the wire to provide a leveraged pull on the plug 1508, thereby removing the plug 1508 from the electrically mating receptacle 1506. According to one embodiment, the plug 1508 includes a releasable hook mechanism which catches on the receptacle 1506 to ensure the plug 1508 remains positioned in electrical contact with the leads of the receptacle 1506.

Similar to plug 1508, a 110 volt plug 1510 includes, according to one embodiment, similar wire of a distinguishing color. The wire is also sturdily connected to contact leads within the plug 1510 and configures the transformer 1304 such that the magnetic flux through at least one portion of the primary windings contradicts the magnetic flux through other portions of the primary windings, thereby causing a load on the secondary windings to receive the same or similar voltage to that when using the 220 volt power source 1310 and the 220 volt plug 1508. Similar to plug 1508, the wire of the plug 1510 is looped such that one or more fingers can hook through the wire and pull the plug 1510 from the electrically mating receptacle 1506.

FIG. 15 also shows the on-board diagnostic indicators 1328. As disclosed in the foregoing, the diagnostic indicators 1328 may comprise LEDs, multi-colored LEDs, LCDs, a combination of the same or the like, representing, for example, the user selected speed setting and one or more fault indicators, such as, for example, improper polarity in the voltage used to drive the fans 1308, or some other fault detected by the integrated circuit 1306. As shown in FIG. 15, one embodiment of the on-board diagnostic indicators 1328 includes an LED for "LOW" and "HIGH" speed settings, and green and red LEDs (i.e., single LEDs with capabilities for showing both green and red) showing the status of the polarity being applied to the fans 1308.

According to one embodiment, the console 36 can include information display arrangements 76 providing feedback to the user of the status of the fans 1308. For example, according to one embodiment, the information display arrangements 76 can include one or more fan speed indicators, such as one or more animated fans or rotating fan blades. For example, when the fan blades are stationary, the fans are "OFF." Alternatively, when the fan blades are rotating the fans are moving. In an embodiment where the user can select between "HIGH," and "LOW," the animated fan blades may rotate at two or more different user-discernable speeds corresponding to the user selected fan setting. These animation rotation speeds advantageously can be much slower than the rotating speed of the fans 1308 to ensure the user can discern the different settings.

Figure 16A:
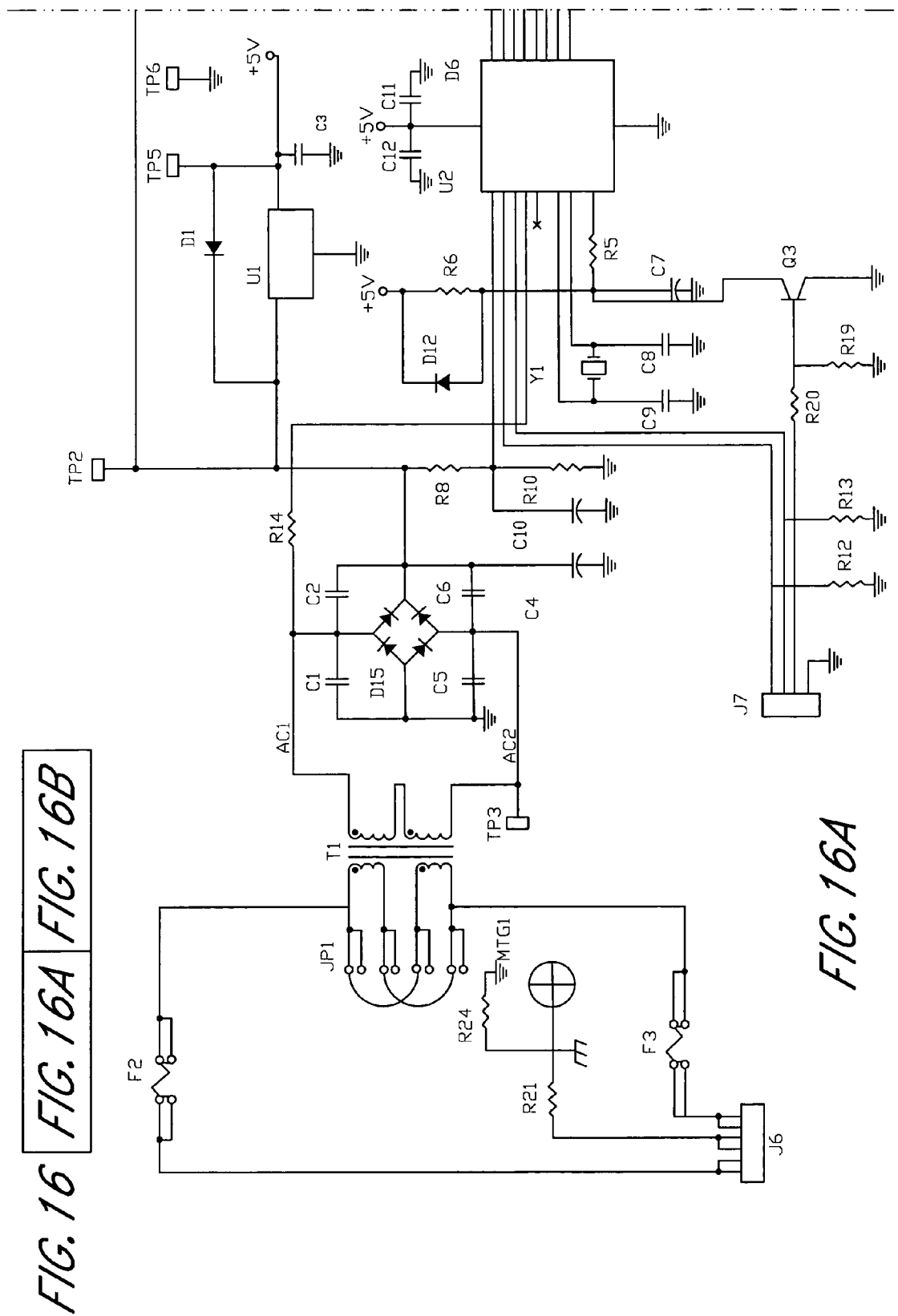
FIG. 16 is a circuit diagram of the fan controller board of FIG. 13, which is arranged and configured in accordance with certain features, aspects and advantages of the present invention.
Figure 16B:
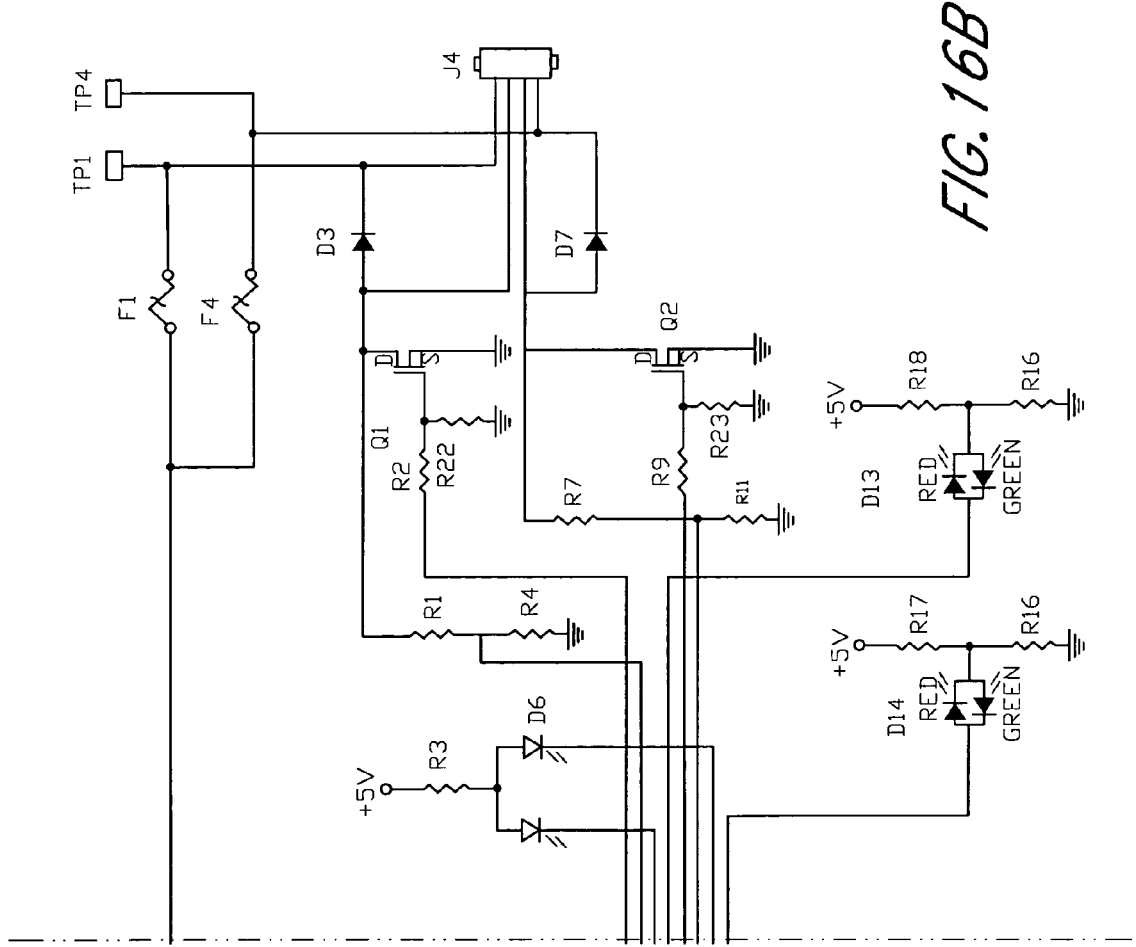

FIG. 16 is one example of a circuit diagram of the fan controller board 1300. The particular values involved with various electronic components in this embodiment are disclosed in Table 3.

TABLE 3

| REFERENCE | PART | REFERENCE | PART |
|---|---|---|---|
| C1, C2, C5, C6 | 0.01 uF/1K V | J4, J7 | MOLEX 43045-0424 |
| C12, C3 | 0.1 uF | J6 | MOLEX 42019-3212 |
| C4 | 2200 uF/35 V | Q1, Q2 | STP30NE06L |
| C7 | 1 uF | Q3 | 2N3904 |
| C8, C9 | 22 pF | R1, R4, R7, R11, R14 | 12K |
| C10 | 100 uF/50 V | R2, R3, R9, R15, R16, R17, R18 | 1K |
| C11 | 0.01 uF | R5 | 470 |
| D1 | 1N4003 | R6 | 39K |
| D3, D7 | 583-FR101 | R8 | 24K |
| D5, D6 | LED | R10 | 9.1K |
| D12 | 1N4148 | R12, R13, R20 | 22K |
| D13, D14 | 604-L937EGW | R19, R22, R23 | 100K |
| D15 | 583-BR61 | T1 | MCI-4-44-7010 |
| F1, F4 | FT_2A_250 V | U1 | LM7805 |
| F2, F3 | 1.25A_SB_250 V | U2 | PIC16C711_P |
| JP1 | MOLEX 42019-4212 | Y1 | 4.0 MHz |

Although the foregoing feature has been described in terms of certain preferred embodiments, other embodiments will be apparent to those of ordinary skill in the art from the disclosure herein. For example, the foregoing toggled or soft start, or its embodiments, may be employed in virtually any circuit which drives a load that can pull near or more current than is appropriate for circuit components. For example, the soft start can be used to power on a person cooling system employing a large chassis-mounted transformer. Moreover, the fans may be voltage-controlled as opposed to the foregoing control using PWM. Also, the user may adjust the fan speed through buttons, turnable knobs, or the like. Also, AC fans may be used in the personal cooling system.

Figure 17:
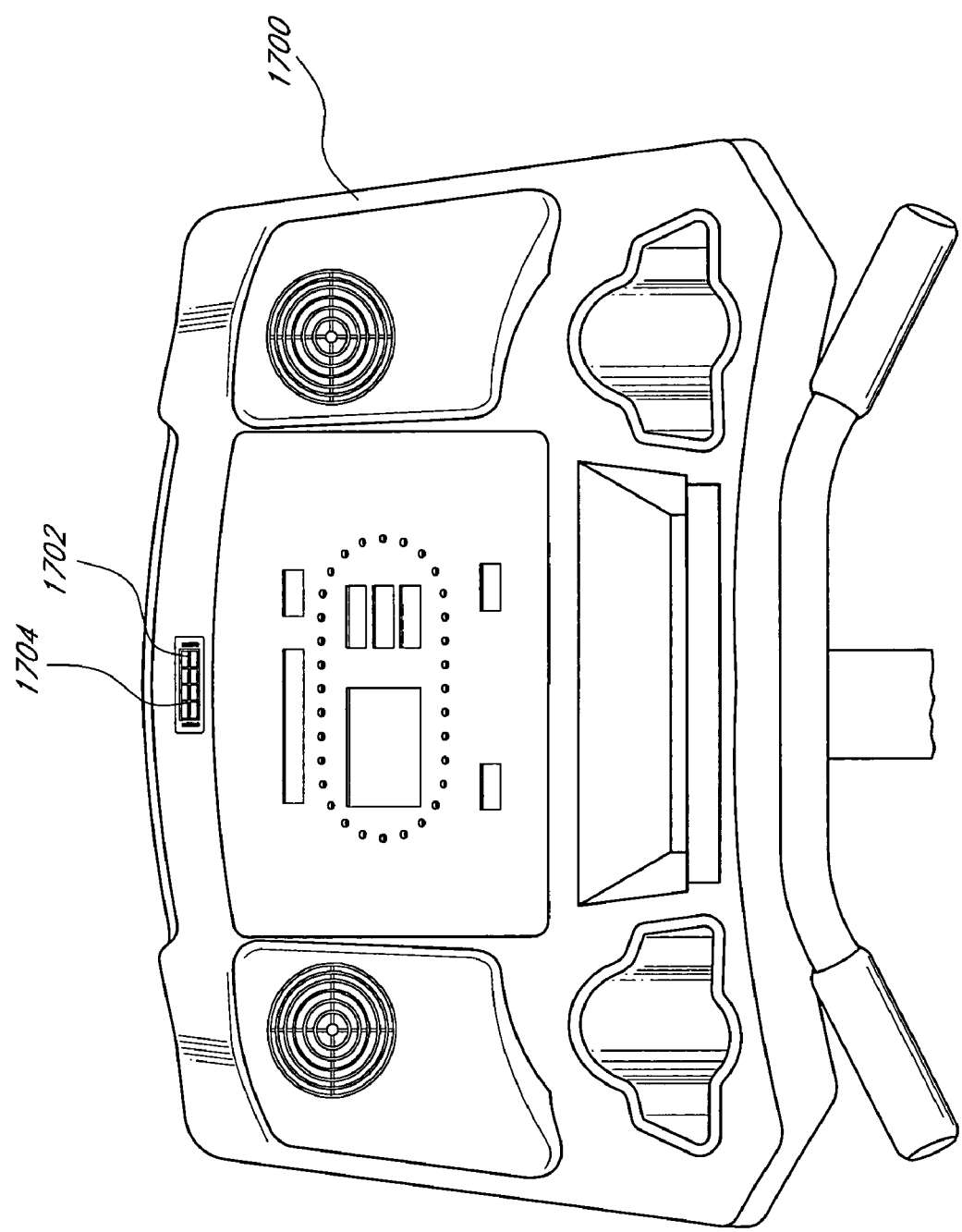
FIG. 17 is a front view of a display console having an adjustable center opening, which is arranged and configured in accordance with certain features, aspects and advantages of the present invention.
Figure 18:
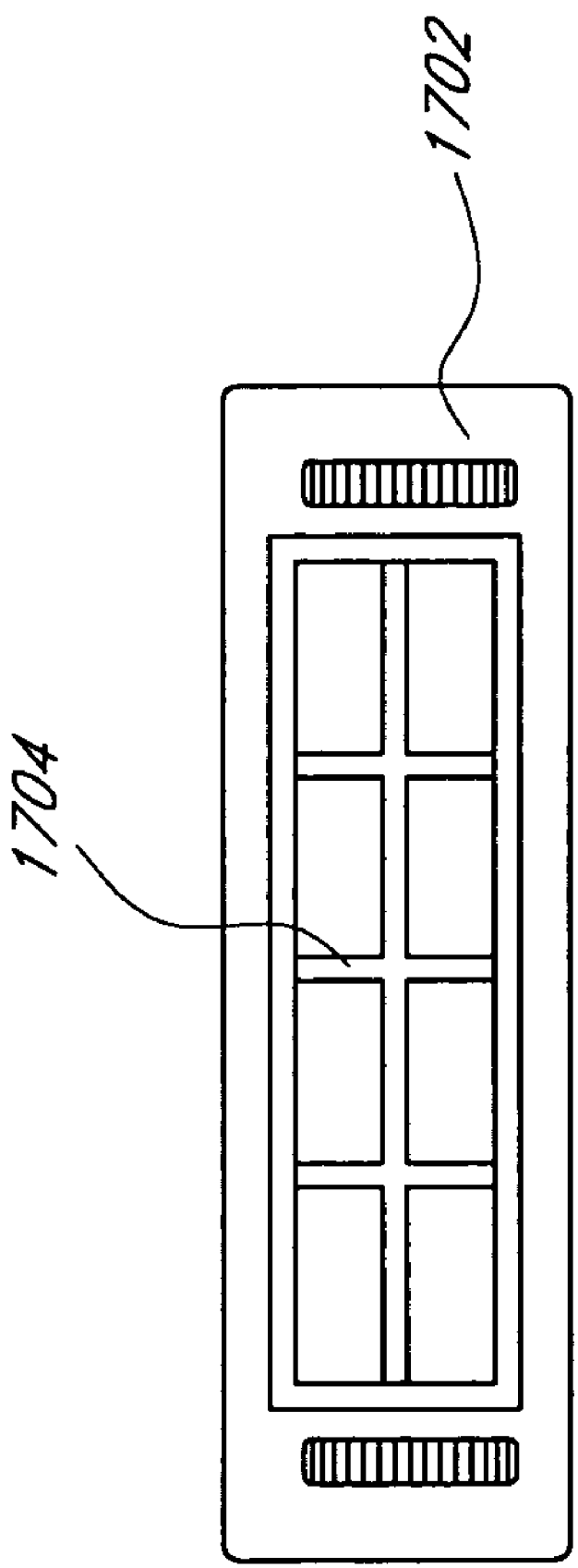
FIG. 18 is a front view of the adjustable center opening of the display console of FIG. 17.

With reference now to FIGS. 17-21, several embodiments of a display console and adjustable openings, such as vents, are illustrated. For example, FIGS. 17-18 illustrate a display console 1700 having an adjustable center opening 1702. As shown in FIGS. 17-18, the adjustable center opening can include manual or automatic rotatable grills, louvers, or vents 1704, configured to remain positioned when the user adjusts the openings to his or her particular preference, such as, for example, the user's height. A wide number of alternative configurations can be used for the openings 1702 and the rotatable vents 1704. For example, the display console 1700 can include multiple openings designed to provide direction to air flow, such as, for example, side openings similar to those discussed with reference to FIGS. 1-11, bottom openings, the foregoing top opening 1702, combinations of the same, or the like. Moreover, the rotatable vents 1704 could be vertically or horizontally mounted in the openings, provide for vertical and/or horizontal adjustment, be configured similar to the nozzle or gimbal arrangements disclosed in the foregoing, combinations of the same, or the like.

Figure 19:
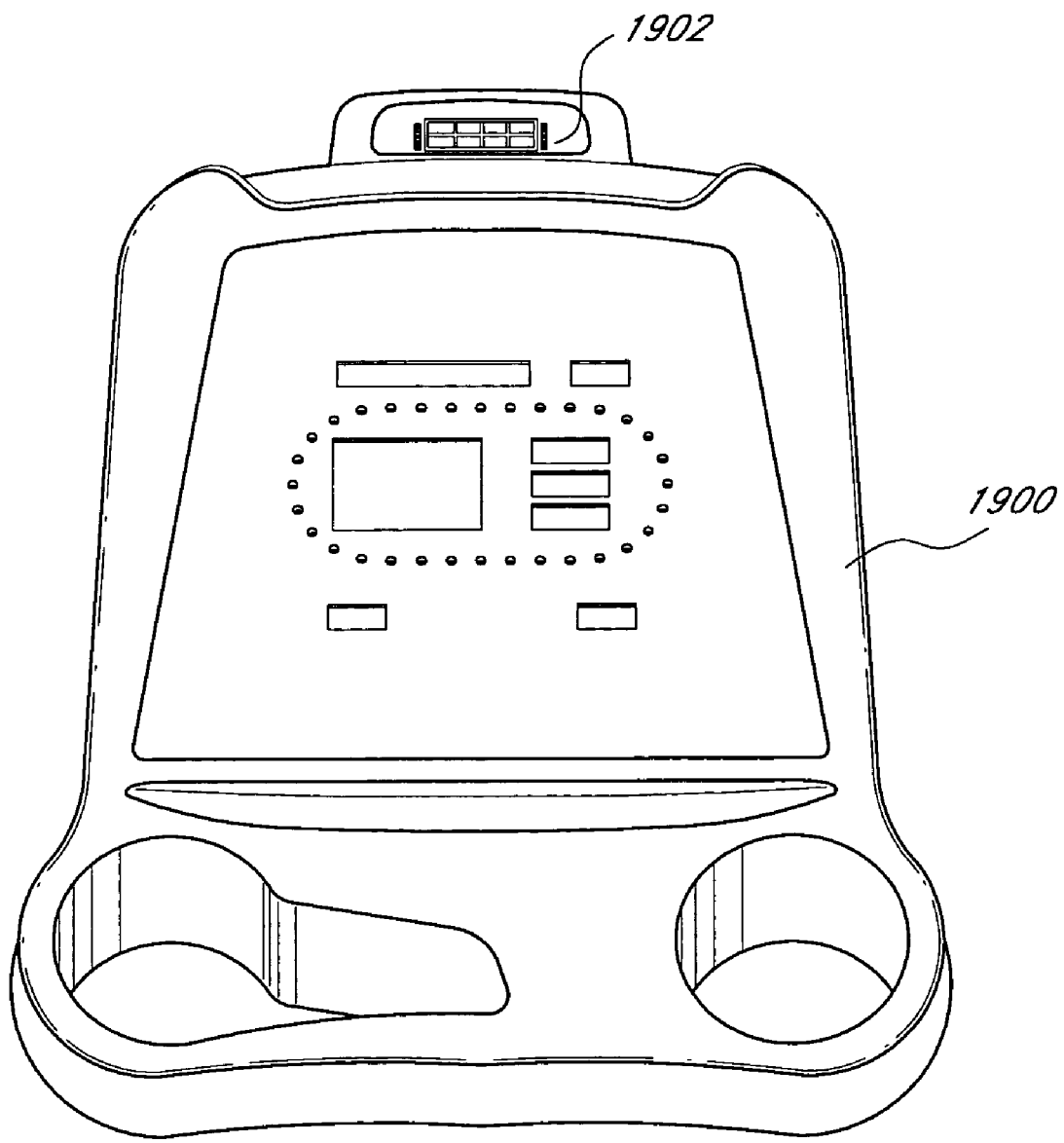
FIG. 19 is a front of a display console having an adjustable center opening, which is arranged and configured in accordance with certain features, aspects and advantages of the present invention.
Figure 20A:
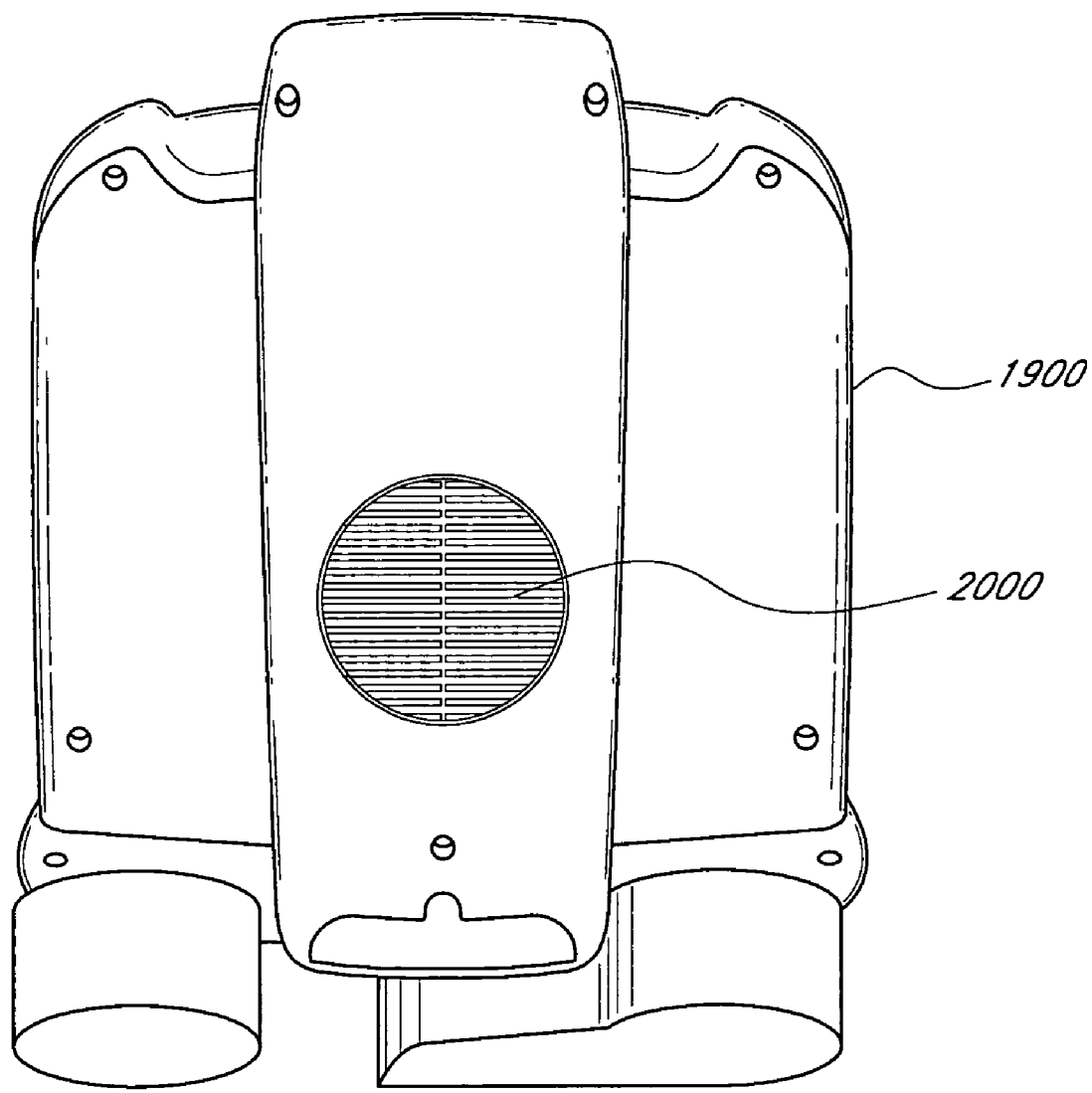
FIG. 20 is a back and side view of the display console of FIG. 19, illustrating embodiments of front and back panels of the display console, as well as air intake and ducting used in a personal cooling system.
Figure 20B:
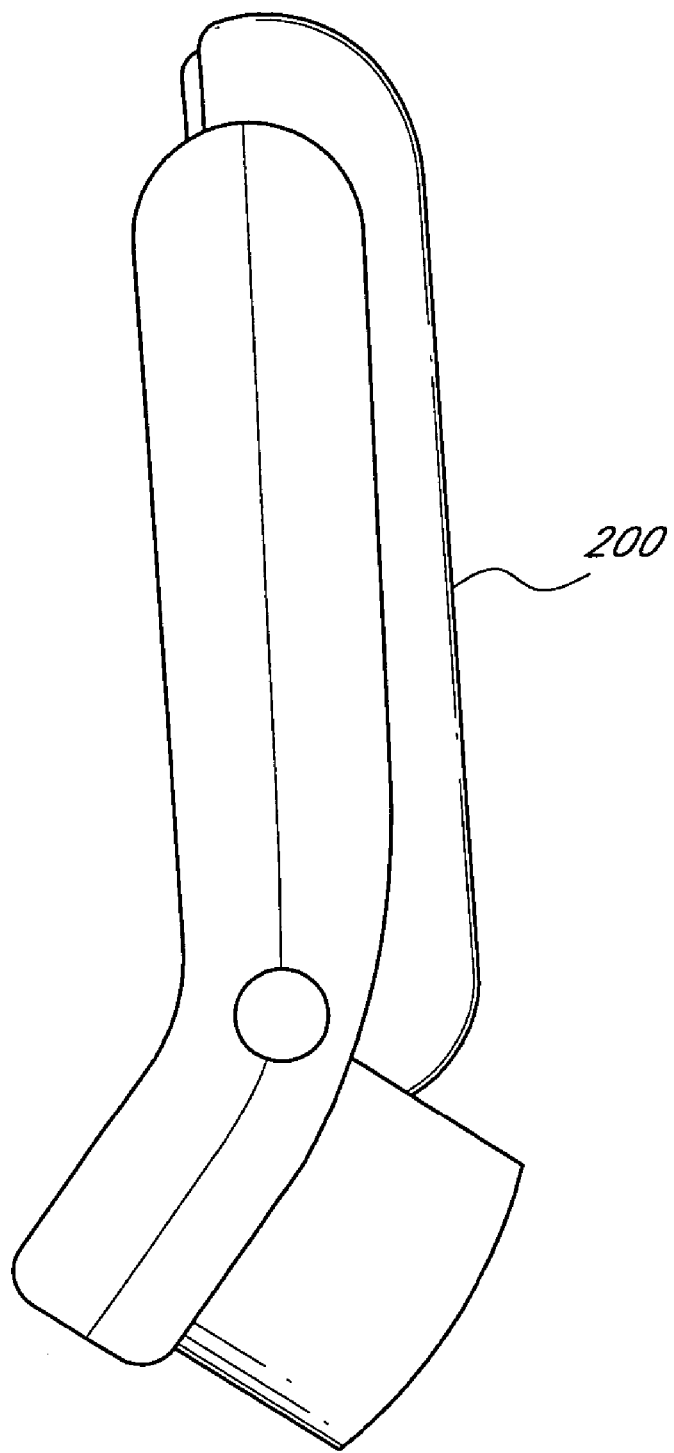

FIGS. 19 and 20 illustrates front, back, and side views of a display console 1900 having an adjustable center opening 1902. As shown, the display console 1900 is formed of a group of suitable plastic moldings, generally comprising front and rear pieces, similar to and for the advantages of, the display console 36 disclosed in the foregoing. FIGS. 20A and 20B also illustrate air intake and ducting 2000 for a personal cooling system similar to those disclosed above.

Figure 21:
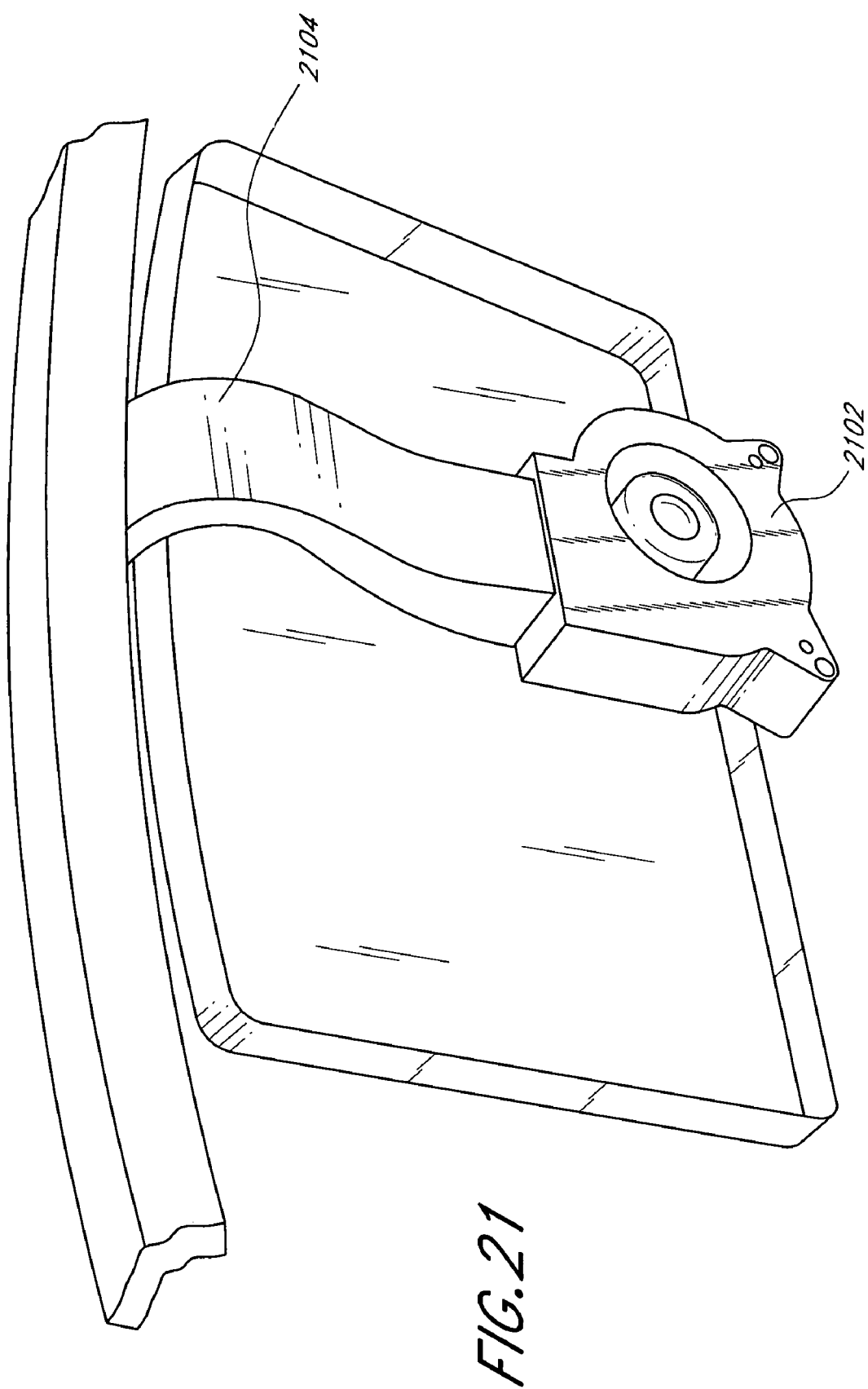
FIG. 21 is a perspective view of the display console of FIG. 19, with the back panel removed to show a squirrel cage fan and ducting for the personal cooling system of FIG. 20.

FIG. 21 is a perspective view of the display console of FIG. 19, with the back panel removed to show a fan assembly 2100, such as, for example, a squirrel cage fan 2102 and ducting 2104 providing air flow for the center opening 1902.

Figure 22:
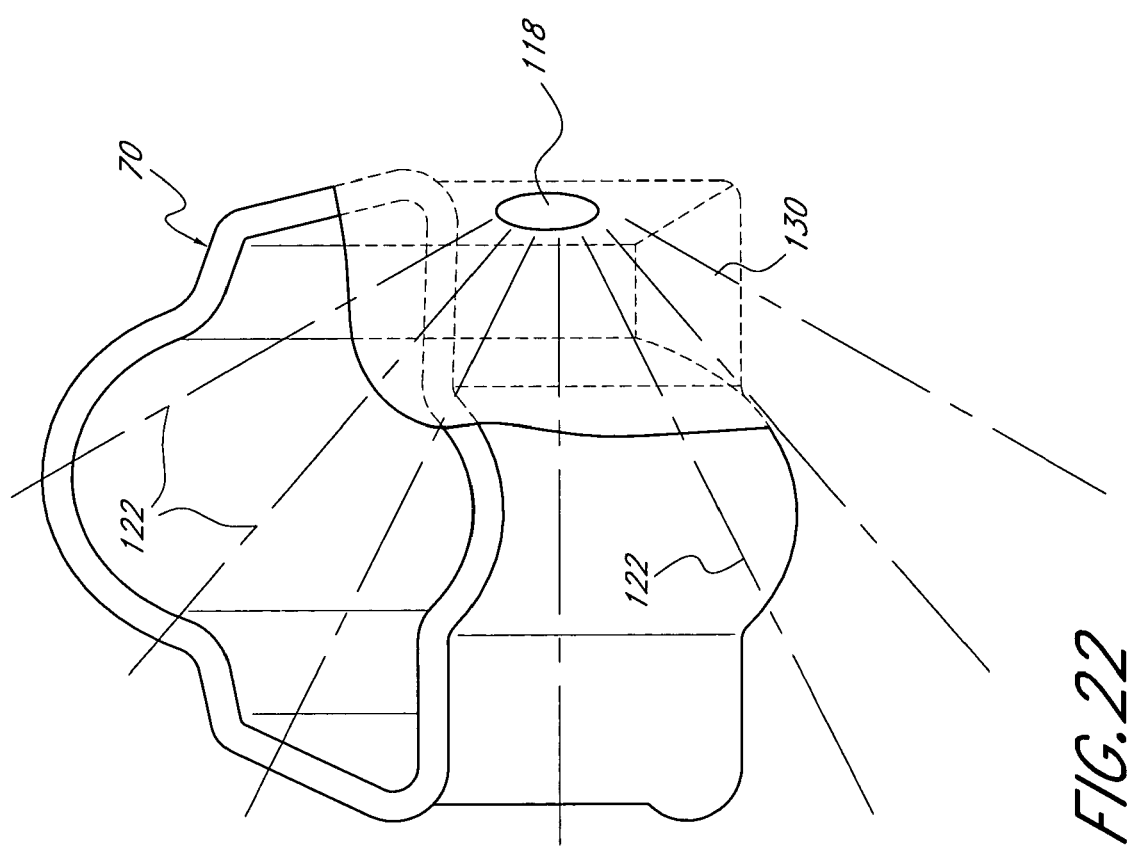
FIG. 22 is a perspective view of the front of a holder illustrating an infrared transceiver positioned on a side with sight lines representing an infrared signal.

FIG. 22 is a perspective front view of the small accessory holder 70 that is arranged and configured in accordance with certain features, aspects and advantages of the present invention. The holder 70 advantageously is designed and configured to allow any of a number of portable electronic device configurations to be properly positioned such that the transceiver of the portable electronic device is within the infrared interaction signal cone (e.g., cone of emission). As used herein, PDA should be understood to encompass, but not be limited to, any portable electronic device with memory storage such that information can be communicated to the portable electronic device for storage and later use by either the portable electronic device or another device to which the portable electronic device is later connected. For instance, PDA can include, but is not limited to, personal data assistants, cellular telephones, portable telephones, handheld wireless communication devices, handheld computers, pocket computers, tablet computers, and the like. Furthermore, while the term cone of emission may be used, this should encompass the angle of emission in any direction as the infrared signal may spread unevenly in some applications. Furthermore, the concept of a cone of emission should be understood to include the fact that a PDA infrared port will have an angle of emission that will intersect with the port of the exercise device for communication to occur. To accomplish a wide range of communication compatibility, the holder 70 can be formed with an elongated pocket that allows for PDA's with top mounted transceivers to be positioned on a side and a depth that allows the PDA's with side mounted transceivers to be positioned upright.

In one arrangement, the holder 70 has a rectangular shaped recess 130 that is between about 4 inches and 6 inches long. The recess 130 more preferably can be about five inches in length. The recess 130 preferably extends laterally along the display console 36. Other orientations can be used and the accessory holder 70 can be designed for placement elsewhere on the exercise machine. The holder also preferably comprises a second rectangular recess 132 that is vertically lower than the first rectangular recess 130. In one arrangement, the recess 132 is between about 0.5 inch and 3 inches lower and in a preferred arrangement the recess 132 is about 1¾ inches lower. The recess 132 preferably has a length of between about 2 and 4 inches and more preferably about 2¾ inches. Preferably, the recess 132 and the recess 130 are generally aligned. In other words, at least a portion of both the first recess 130 and the second recess 132 preferably overlap in a top view. As such, a PDA in an upright orientation 134 and a PDA positioned on a side 136 can be properly positioned for communication with only one infrared port 118. The lengths also allow some lateral movement of most PDA configurations such that the PDA can be shifted relative to the port 118 to achieve proper alignment for communication, if necessary.

Figure 25:
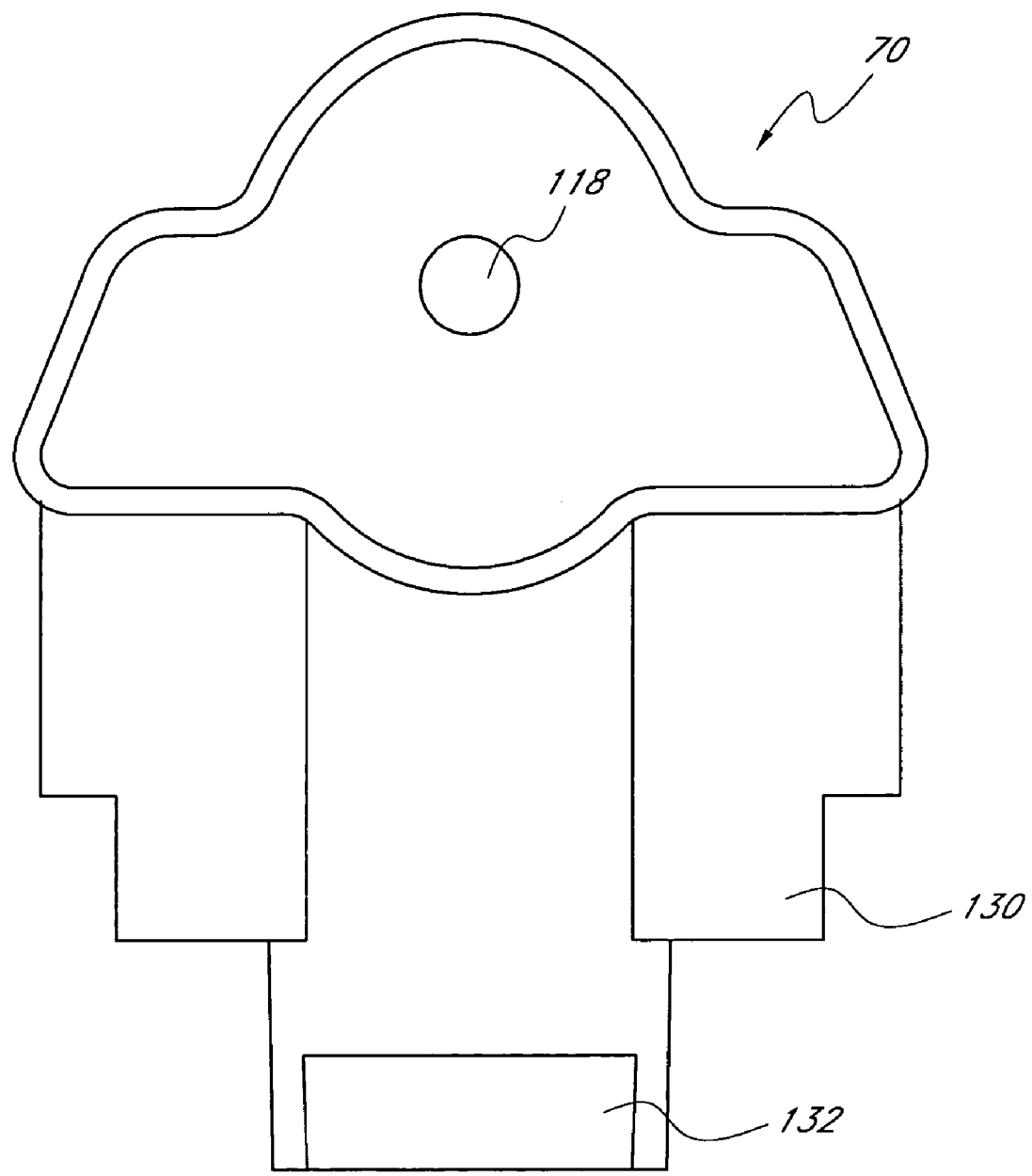
FIG. 25 is a front elevation view of the holder illustrating a pair of recesses that are arranged and configured in accordance with certain features, aspects and advantages of the present invention.
Figure 26:
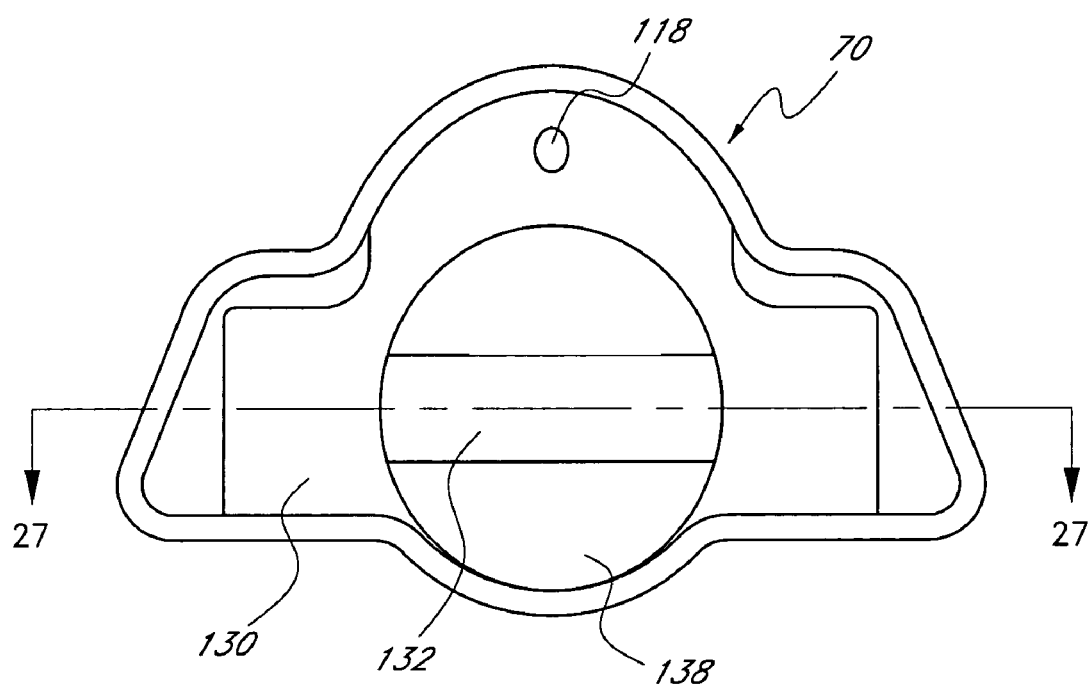
FIG. 26 is a top plan view of the holder of FIG. 25.
Figure 27:
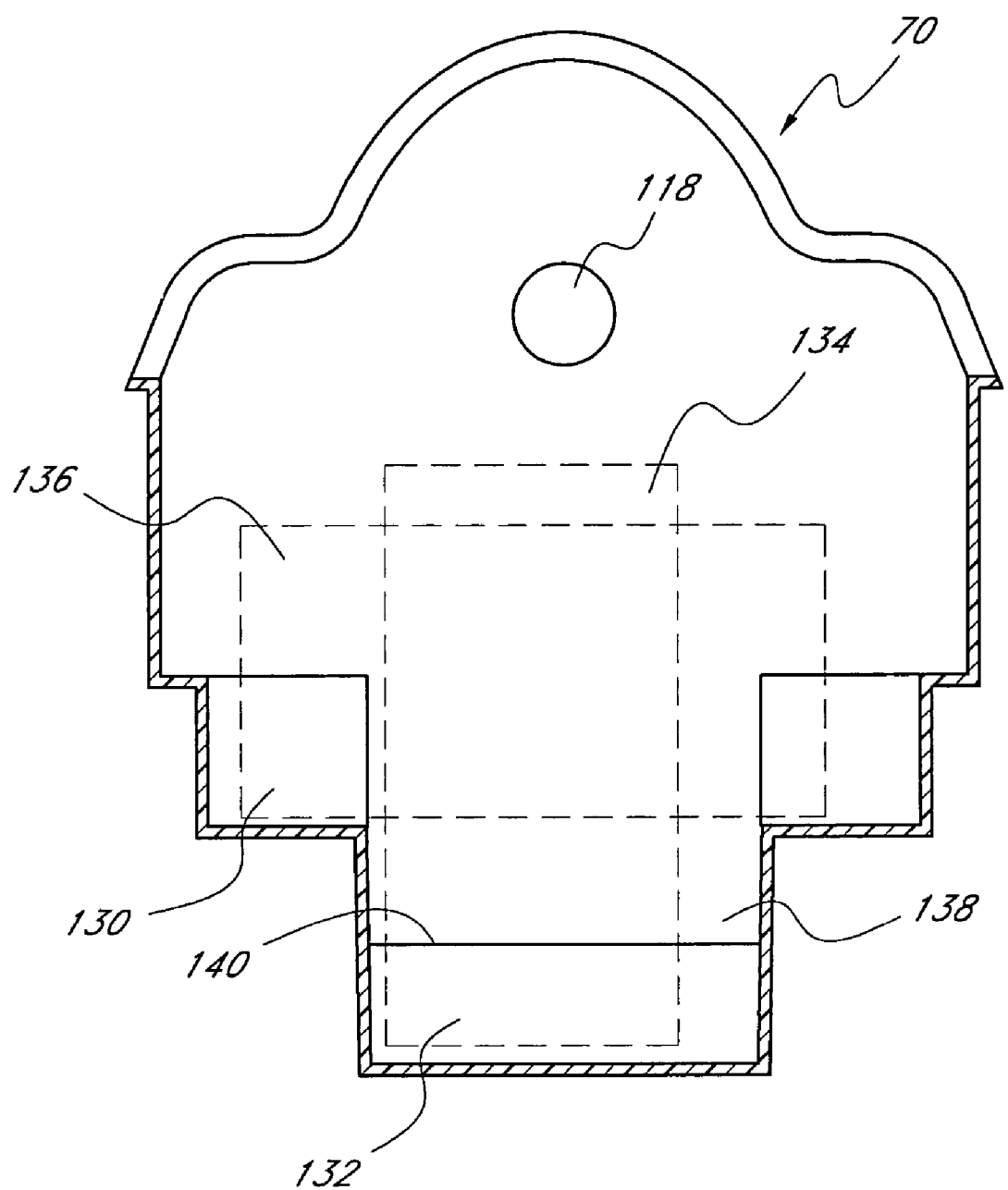
FIG. 27 is a sectioned view of the holder of FIG. 25 taken along the line 27-27 in FIG. 26.

As illustrated in FIGS. 25-27, the holder 70 also has a cylindrical portion 138 that allows the holder to hold a water bottle or the like. In the illustrated arrangement, this cylindrical portion 138 has a bottom surface 140 that is vertically disposed between the bottom surfaces defining a portion of the first recess 130 and the second recess 132. Other configurations also are possible.

In the illustrated arrangement, the right front corner portion of the accessory holder 70 is shown in hidden lines to illustrate one possible position of an infrared port 118. The infrared port 118 is advantageously positioned to one side to accurately communicate with a variety of PDAs. The infrared port 118 preferably communicates with an electronic control unit (ECU) or other suitable component of the exercise device in any suitable manner. In one arrangement, the ECU is used to control the speed of a treadmill, the elevation of a treadmill and the like. Thus, the infrared port 118, which is suitably connected to the ECU, allows data to be transferred to and from the ECU via the infrared port 118.

The infrared port 118 can be disposed adjacent to the holder 70 in the console of the exercise equipment. The holder 70, as described above, allows a PDA to be positioned upright or on a side within the holder 70. These two positions allow the infrared transceiver of many PDA designs to be disposed within a cone defined by the port 118. The cone shaped interaction signal is represented by the number 122 in FIGS. 22 and 23.

Figure 23:
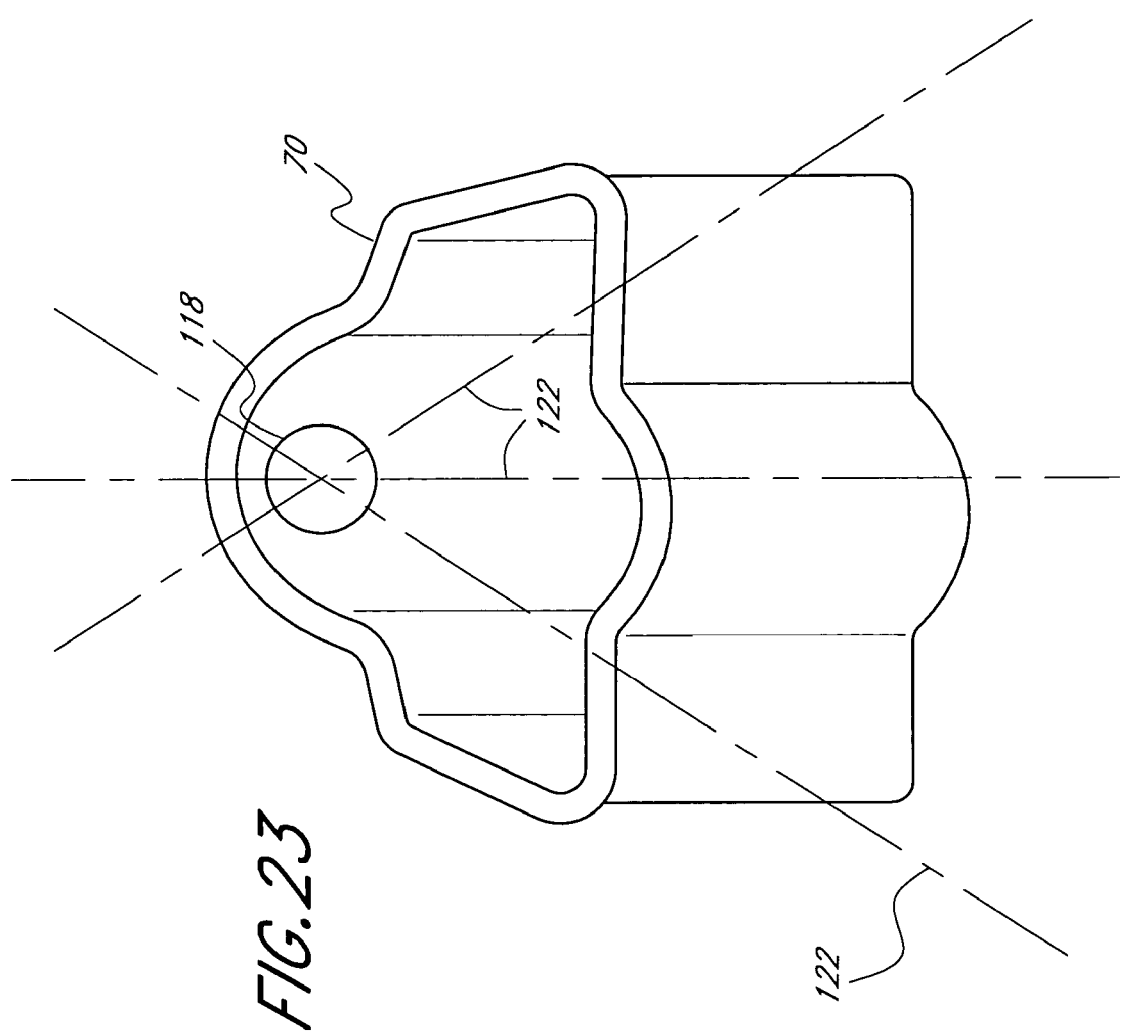
FIG. 23 is a perspective view of the front of a holder illustrating an infrared transceiver positioned on a rear side with sight lines representing an infrared signal.

FIG. 23 is a perspective front view of the small accessory holder 70 that also is arranged and configured in accordance with certain features, aspects and advantages of the present invention. The infrared port 118 is advantageously positioned on an upper rear side of the holder 70. This placement also allows accurate communication with an wide variety of PDA designs as the PDA can be positioned upright or on a side. The infrared sensor can be disposed adjacent to the holder 70 in the console of the exercise equipment.

Figure 24:
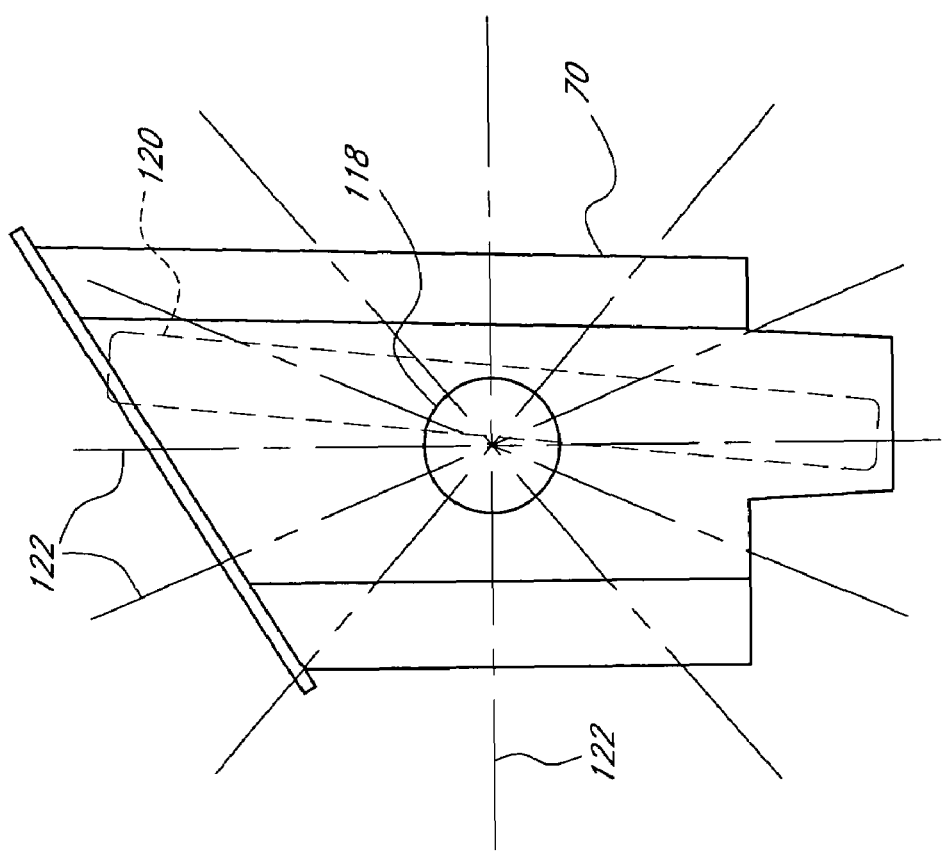
FIG. 24 is a side view of the holder illustrating an infrared transceiver position with sight lines representing the infrared signal and a PDA illustrated in phantom placed within the holder.

FIG. 24 illustrates a side view of the holder 70 with a typically shaped PDA 120 shown in phantom. The PDA 120 is placed in the holder 70 on a side, which allows accurate communication between that particular configuration of PDA 120 and the illustrated holder 70.

Advantageously, the holder 70 can be formed of a material that is generally transparent (i.e., allows the passage of a specified form of radiation) to infrared signals. The holder 70 can have at least one portion that is generally transparent to infrared signals (e.g., a window) or can be completely formed of a material that is generally transparent to infrared signals. Even more advantageously, the material selected is generally transparent to infrared signals but is generally optically opaque (i.e., blocks the passage of light). Such a material selection masks the location of the infrared port 118 to provide a more aesthetically pleasing appearance to the exercise equipment while still allowing communication directly between the PDA and the exercise device. Thus, the port can be covered and an opening of the infrared port is not required. Such an enclosed construction disguises the infrared infrastructure for aesthetic reasons and reduces the number of openings for ease of cleaning and improved operation.

Materials transparent to infrared signals and generally opaque used for the holder 70 can include, but are not limited to, various acrylics and polycarbonates. In one preferred embodiment of the present invention the material used for the holder 70 can be Lexan 121. Lexan 121 has wavelength cutoff value between 600 and 700 nanometers, allowing infrared light (900 nm) to pass through while being generally opaque.

While the illustrated embodiments feature an infrared transceiver as a wireless communications hub for the exercise device, other suitable communications protocols also can be used. In one particular arrangement, any other suitable communications protocol can be used with a holding device such that communication between the exercise device and a portable electonic device can be enabled. For instance, the communication can occur by telemetry, directional antennae, blue tooth and the like. Preferably, the range of communication is limited such that communication is facilitated between a single portable electronic device and a single exercise machine. More preferably, the range of communications is less than about three feet. Even more preferably, the range of communications is less than about one foot. In the illustrated arrangement, the range is less than about six inches such that unintended control of an exercise machine is less likely.

It should be mentioned that the holder also can be provided with a power port or a physical data connector in some arrangements. These arrangements are particularly advantageous in a fitness club environment in which the users are provided with a particular model of PDA. In such arrangements, the physical connector and/or power source can be installed such that the holder 70 acts a docking cradle for the particular PDA. In further arrangements, the holder can be provided with a universal battery recharging system such as a a power pad, for instance, which has bumps on the surface that act as contact points. In such arrangements, devices, including laptops, cell phones and handhelds, that have been manufactured with an adapter chip inside can be recharged simply by placing the devices in the holder, which allows the transfer of power from the power pad to the devices. In one arrangement, the same recharging system also can facilitate the exchange of data.

Communication between the PDA and the exercise equipment offers a variety of possible applications such as downloading a workout program to the exercise equipment. The exercise equipment can also transfer information to the PDA regarding workout progress and performance. The PDA communication can also be used for equipment analyses. For example, information can be transferred to the PDA informing the owner of an exercise equipment maintenance schedule. The PDA can also act as a troubleshooting guide by reading exercise equipment faults (e.g., operational status and/or error flags) and offering possible solutions or communicating the faults to the manufacturer of the equipment.

Although the present invention has been described in terms of a certain embodiment, other embodiments apparent to those of ordinary skill in the art also are within the scope of this invention. Various changes and modifications may be made without departing from the spirit and scope of the invention. For instance, various components may be repositioned as desired. Moreover, not all of the features, aspects and advantages are necessarily required to practice the present invention. Additionally, all publications, patents, and patent applications mentioned in this specification are herein incorporated by reference to the same extent as if each individual publication, patent, or patent application was specifically and individually indicated to be incorporated by reference. Accordingly, the scope of the present invention is intended to be defined only by the claims that follow.

What is claimed is:

1. An exercise machine comprising a wireless communication system, said wireless communication system comprising a holder arranged to support a portable electronic device in at least two orientations and a wireless communication device mounted to communicate with said portable electronic device positioned within said holder in said at least two orientations, said holder formed of a material that is generally transparent to wireless signals and that is optically opaque.

2. The device of claim 1, wherein said wireless communication system comprises a transceiver that is disposed to one side of said holder.

3. The device of claim 1, wherein said wireless communication system comprises a transceiver and said holder is disposed between said transceiver and a user of said exercise machine.

4. The device of claim 1, wherein said wireless communication system comprises a transceiver and said transceiver is remotely mounted next to said holder.

5. The device of claim 1, wherein said holder includes a generally cylindrical portion and a recessed slot portion that intersect to effectively hold accessories.

6. The device of claim 1, wherein said device comprises a personal data assistant.

7. The device of claim 1, wherein said exercise machine comprises a treadmill.

8. The device of claim 1, wherein the holder is interposed between the wireless communication device and a region of the holder that supports the portable electronic device.

* * * * *

UNITED STATES PATENT AND TRADEMARK OFFICE
CERTIFICATE OF CORRECTION

PATENT NO.        : 7,618,345 B2
APPLICATION NO. : 10/698236
DATED             : November 17, 2009
INVENTOR(S)       : Corbalis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1367 days.

Signed and Sealed this

Nineteenth Day of October, 2010

David J. Kappos
*Director of the United States Patent and Trademark Office*